(12) United States Patent
Reynolds et al.

(10) Patent No.: US 11,922,009 B2
(45) Date of Patent: Mar. 5, 2024

(54) USING A STYLUS TO INPUT TYPED TEXT INTO TEXT BOXES

(71) Applicant: Google LLC, Mountain View, CA (US)

(72) Inventors: Donny Chen Reynolds, San Francisco, CA (US); Claire Tauziet, Redwood City, CA (US); Ana Raquel Garcia, Irving, TX (US); John Henry Charles Palmer, Sydney (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/952,954

(22) Filed: Sep. 26, 2022

(65) Prior Publication Data

US 2023/0195302 A1 Jun. 22, 2023

Related U.S. Application Data

(60) Provisional application No. 63/290,749, filed on Dec. 17, 2021.

(51) Int. Cl.
*G06F 3/04883* (2022.01)

(52) U.S. Cl.
CPC ............................. *G06F 3/04883* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 8,175,389 B2 | 5/2012 | Matic et al. | |
| 2004/0160427 A1* | 8/2004 | Keely, Jr. .............. | G06F 3/0483 345/179 |
| 2006/0007189 A1* | 1/2006 | Gaines, III ......... | G06V 30/1423 382/187 |
| 2009/0160785 A1 | 6/2009 | Chen et al. | |
| 2010/0083162 A1 | 4/2010 | Hernandez | |
| 2012/0121181 A1* | 5/2012 | Markiewicz ......... | G06V 30/387 382/186 |
| 2014/0055399 A1 | 2/2014 | Lee et al. | |
| 2014/0111440 A1 | 4/2014 | Garside et al. | |
| 2019/0339861 A1* | 11/2019 | Lee .................... | G06V 30/1423 |
| 2020/0356251 A1* | 11/2020 | Gobera Rubalcava ...................... | G06V 30/347 |

(Continued)

FOREIGN PATENT DOCUMENTS

KR 20110072818 A 6/2011

OTHER PUBLICATIONS

"Draw, Annotate, and Use Scribble in Pages", Copyright 2021 Apple Inc., pp. 1-5, Downloaded from the internet on Nov. 30, 2021, url: https://support.apple.com/en-us/HT208459.

(Continued)

*Primary Examiner* — Seth A Silverman
(74) *Attorney, Agent, or Firm* — Botos Churchill IP Law

(57) ABSTRACT

The technology relates to allowing a user to enter text into text boxes using a stylus. For instance, first user input identifying a text box displayed on a display of the computing device may be received. Based on the received first user input, a handwriting field may be generated on the display without visual impact on the display. A second user input within the handwriting field may be received. The second user input may be converted into typed text, and the typed text may be displayed in the text box.

24 Claims, 25 Drawing Sheets

(56) References Cited

U.S. PATENT DOCUMENTS

2020/0356254 A1* 11/2020 Missig ............... G06F 3/0485

OTHER PUBLICATIONS

"Enter Text With Scribble on iPad", iPad User Guide, United States, Copyright 2021 Apple Inc., pp. 1-2, Downloaded from the internet on Nov. 30, 2021, url: https://support.apple.com/guide/ipad/enter-text-with-scribble-ipad355ab2a7/ipados.

"Handwriting Recognition on Surface Tablets", pp. 1-10, Downloaded from the Internet on Nov. 30, 2021, url: https://www.lovemysurface.net/handwriting-recognition-on-surface/.

"How Do You Convert Handwriting to Text and Other Formats Using S Pen and Samsung Notes?", Downloaded Nov. 30, 2021, url: https://www.samsung.com/sg/support/mobile-devices/how-do-you-convert-handwriting-to-text-and-other-formats-using-s-pen-and-samsung-notes/.

"How to Take Notes on Your Surface Device", Windows Blog by Microsoft Devices Team, 2015.

"How to Use Your Surface Pen", pp. 1-7, Downloaded Nov. 30, 21, url: https://support.microsoft.com/en-us-surface/how-to-use-your-surface-pen-8a403519-cd1f-15b2-c9df-faa5aa924e98#WindowsVersion=Windows_10.

"How to Use Your Surface Pen", pp. 1-7, Downloaded Nov. 30, 21, url: https://support.microsoft.com/en-us-surface/how-to-use-your-surface-pen-8a403519-cd1f-15b2-c9df-faa5aa924e98#WindowsVersion=Windows_11.

"Making Content Editable", MDN Web Docs, Developer Guides, MDN, pp. 1-7, Downloaded from the Internet on Dec. 7, 2021, url: https://developer.mozilla.org/en-us/docs/Web/Guide/HTML/Editable_content.

"Take Handwritten Notes with Cursive", Chromebook Help, pp. 1-2, Downloaded for the Internet on Nov. 30, 2021, url: https://support.google.com/chromebook/answer/11073444?p=note_taking&visit_id=637738917556348299-2475359698&rd=1.

"Use Your Pixel Pen", pp. 1-3, Downloaded from Internet on Nov. 30, 2021, url: https://support.google.com/pixelbook/answer/7504062?hl=en.

"What is the Direct Pen Input Option?" pp. 1-3, Downloaded from the Internet on Nov. 30, 2021, url: https://www.samsung.com/africa_en/support/mobile-devices/what-is-the-direct-pen-input-option/.

De Fremery, "Converting Handwriting to Text and Other S Pen Productivity Tips", pp. 1-9, Downloaded from the internet on Nov. 30, 2021, url: https://insights.samsung.com/2020/08/20/converting-handwriting-to-text-and-other-s-pen-productivity-tips/.

Li, "Cursive is Google's New PWA for Handwritten Notes on Chromebooks with Styluses", 2021, pp. 1-5, Downloaded from the Internet on Dec. 1, 2021, url: https://9to5google.com/2021/08/10/google-cursive-chromebook/.

Rathbone, "How to Draw and Write With a Stylus on Your Surface", dummies, pp. 1-7, Downloaded from the internet on Nov. 30, 2021, url: https://www.dummies.com/consumer-electronics/surface/how-to-draw-and-write-with-a-stylus-on-your-surface/.

Tauziet, et al., "Automatic Grouping and Categorization of Objects in Drawing or Inking Apps", Technical Disclosure Commons, 2020, pp. 1-11.

International Search Report and Written Opinion for International Application PCT/US2022/051471 dated Mar. 24, 2023 (7 pages).

* cited by examiner

USING A STYLUS TO INPUT TYPED TEXT INTO TEXT BOXES

CROSS REFERENCE TO RELATED APPLICATION

This application claims the benefit of the filing date of U.S. Provisional Patent Application No. 63/290,749 filed Dec. 17, 2021, the disclosure of which is hereby incorporated herein by reference.

BACKGROUND

Computing devices such as desktop and laptop computers have various user interfaces that allow users to interact with the computing devices. For example, such interfaces may include a keyboard, a mouse, a touchpad, a touch screen, buttons, stylus etc. A user may control various functions of the computing devices and user applications installed on the computing devices through these interfaces.

A stylus is a writing tool which may have a shape similar to a pen, pencil or other writing instrument. Many systems offer functionality that enables a user to write on a touch-sensitive input surface in the user's own handwriting which is then converted to text on the screen. Some of these may also provide static or movable toolbars as well as editing of such converted text via gestures using a stylus tool. However, use of these stylus tools can often require numerous steps and popup handwriting interfaces which are visually detached or different from the fields in which a user intends to input text, making them somewhat inefficient and difficult to use.

BRIEF SUMMARY

Aspects of the disclosure provide a method. The method includes receiving, by one or more processors of a computing device, first user input identifying a text box displayed on a display of the computing device; based on the received first user input, generating, by the one or more processors, a handwriting field on the display without visual impact on the display; receiving, by the one or more processors, second user input within the handwriting field; converting, by the one or more processors, the second user input into typed text; and displaying, by the one or more processors, the typed text in the text box.

In one example, the text box corresponds to at least one of a text message, a cell of a spreadsheet document, a search field, or an email. In another example, the first user input includes a stylus tapping or dragging on an area within the text box. In another example, the first user input includes a stylus tapping on an area within a predetermined distance of the text box. In another example, the first user input includes a stylus beginning to write within an area of the text box. In this example, the method also includes receiving third user input outside of the handwriting field and disregarding the third user input without updating the typed text in the text box.

In another example, the handwriting field is generated without requiring the one or more processors to first call and display a virtual keyboard. In another example, the handwriting field is a two-dimensional field that is registered as an area at which the one or more processors can expect to receive and display strokes made using a stylus on display. In another example, the handwriting field is generated to correspond to an area of the text box and an additional area within a predetermined distance of the text box. In another example, the method also includes, as the second user input is received, expanding an area of the handwriting field. In another example, the handwriting field is generated to correspond to an entire area of the display. In another example, the method also includes in response to receiving the first user input, displaying a toolbar based on a location of the text box on the display.

In another example, the method also includes, displaying handwriting as the second user input is being converted to the typed text. In this example, the method also includes changing an appearance of the displayed handwriting based on proximity to an edge of the handwriting field or a display of the client computing device. In addition, or alternatively, the method also includes, once the typed text is displayed, causing the displayed handwriting to disappear from the display. In addition, or alternatively, the method also includes, once the typed text is displayed, displaying an animation that depicts the displayed handwriting fading away or fading into the typed text and disappearing. In addition, or alternatively, the method also includes, once the displayed handwriting has disappeared from the display, causing an area of the handwriting to no longer be writable within the handwriting field.

In another example, the method also includes receiving third user input within the handwriting field, identifying a gesture based on the received third user input, and editing the typed text in the text box based on the identified gesture. In another example, the method also includes receiving third user input within a second text box and, in response to receiving the third user input, displaying a notification indicating that a writing mode is unavailable for the second text box. In another example, displaying the typed text in the text box includes displaying within a browser window.

Another aspect of the disclosure provides a system. The system includes a computing device having a display and one or more processors configured to receive first user input identifying a text box displayed on the display, based on the received first user input, generate a handwriting field on the display without visual impact on the display, receive, second user input within the handwriting field, convert the second user input into typed text; and display the typed text in the text box.

In one example, the system also includes a stylus, and the first user input includes the stylus tapping or dragging on an area within the text box. In another example, the system also includes a stylus, and the first user input includes the stylus tapping on an area within a predetermined distance of the text box.

DETAILED DESCRIPTION

Overview

Figure 1:
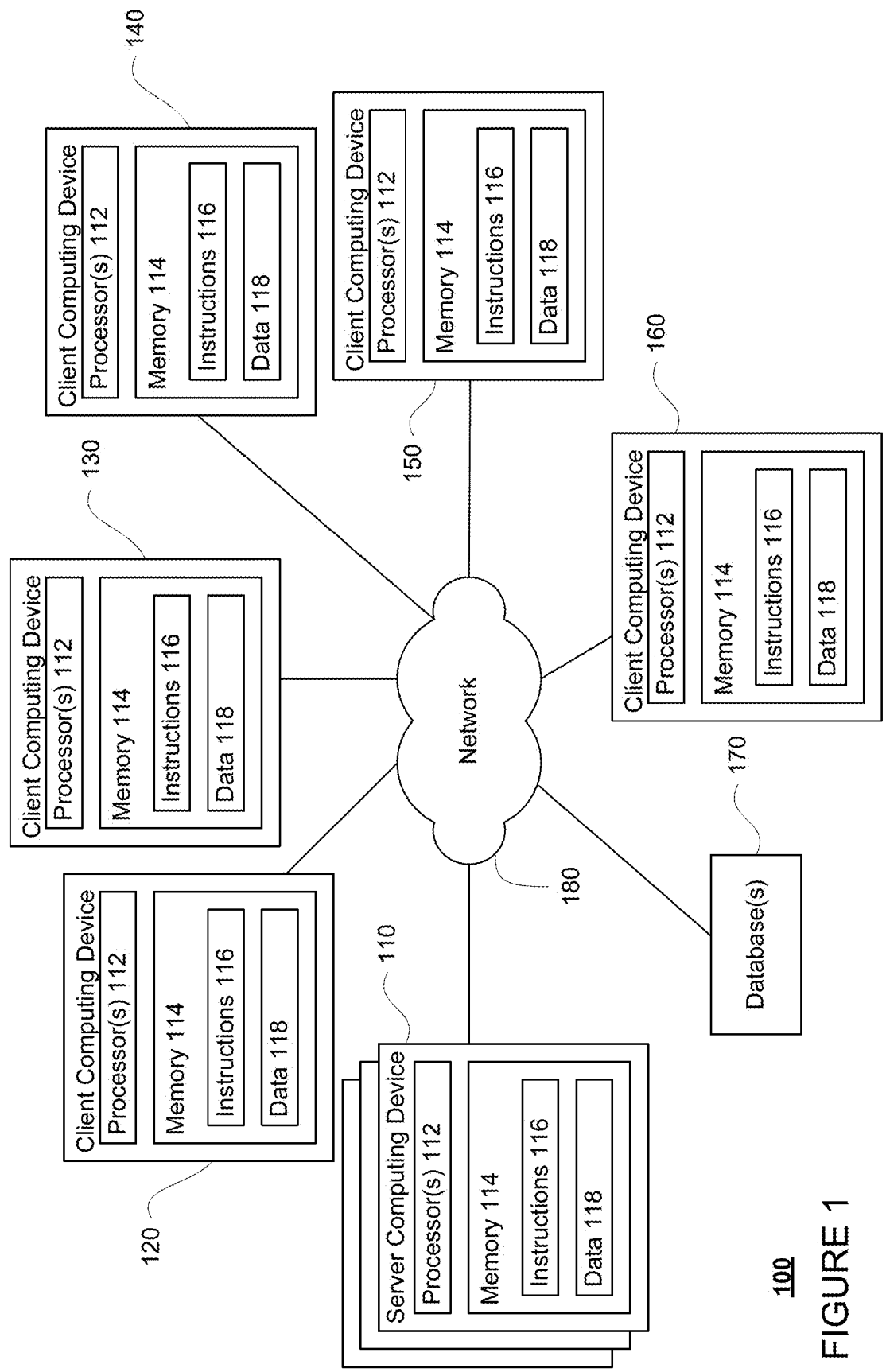
FIG. 1 is a block diagram of an example system in accordance with aspects of the disclosure.

Aspects of the technology relate to providing support for using a stylus to input text via handwriting in any text box or field in a way that is efficient and intuitive to users and thereby provides an improved stylus-based human-computer interface. While many systems currently support handwriting to text for stylus users, some systems require that users first open a virtual keyboard to access this functionality. This is inefficient in that it may require users to make a series of taps to navigate to the handwriting keyboard and submit their writing for text conversion. The virtual keyboard can also take up a substantial portion of the display, which may impair the user's ability to effectively use their device. The inefficiency of the process may adversely affect the ability of users to complete certain writing tasks like using a search field, writing in message applications (e.g., sending text messages), and filling out online forms quickly and easily. The features described herein may allow a user to write directly into text boxes without needing to summon the virtual keyboard or displaying a detached handwriting interface separate from the text box.

First user input identifying a text box may be received using a stylus of a user on a touch sensitive display of a computing device. This input may essentially be recognized by the processors of the computing device as a request to input text into the text box using the tip of the stylus and may therefore cause the processors to enable a writing mode as discussed further below. In some implementations, this first user input may be the user starting to write using the stylus.

Based on the received first user input, a handwriting field may be generated. In this regard, the processors may activate a writing mode which allows a user to make strokes within the handwriting field using the tip of the stylus in order to insert typed text into the text box. This handwriting field may also be associated with the text box such that input to the handwriting field is converted to text and the converted text displayed in the text box.

The handwriting field may be a two-dimensional field that is registered as a "handwriting canvas" at which the processors can expect to receive and display strokes made using a stylus on the touch sensitive display. The handwriting field may be "present" on the touch sensitive display but provided without visual impact on the display. In other words, the handwriting field may be invisible to the user, and unlike other systems which utilize popup boxes for handwriting fields, the invisible handwriting field may not create an impediment to viewing (and interacting with) other information or images displayed on the display.

The handwriting field may be generated, at least initially, to correspond to the area of the identified text box or the area of the identified text box with the additional area within the predetermined distance from the text box. In some instances, as the user continues to write, the handwriting field may expand towards the edge of the display in a direction corresponding to the direction in which the stylus is moving generally. Alternatively, rather than expanding the handwriting field, the handwriting field may be generated to be the size of the entire display.

Second user input may be received within the handwriting field. The user may use the stylus to begin or continue writing within the area of the handwriting field and in response, corresponding markings may be displayed in the user's handwriting. In this regard, the handwriting field may be an area in which strokes and taps using the tip of the stylus are automatically interpreted as handwriting and displayed rather than being interpreted as "mouse tasks" like clicking. As the user writes, the processors may display the handwriting before or as it is being processed into converted to typed text.

The second user input may be converted to typed text, and the typed text may be displayed within the text box. The conversion of the handwriting to typed text may be performed using any known approaches, but may be performed in real time. In this regard, once a word is completed, it may be automatically converted to typed text, and the typed text displayed in the text box, rather than displaying a popup box or detached handwriting interface which requires the user to first confirm or accept the text by closing the detached handwriting interface or selecting some option (e.g., enter). As such, the user's handwriting is automatically converted to typed text as the user writes, rather than having to first click submit, enter or use some other input to initiate the conversion. In addition, by utilizing the features described above, users do not first need to open the virtual keyboard or other application to be able to utilize the stylus to add text to the text box. As such, users can write anywhere within or close to the text box and automatically input information into the text box using a stylus rather than having to write within a detached handwriting interface.

Once the typed text is converted, the processors may display the typed text within the text box at the location of the cursor. In this regard, as the user continues to write and additional handwritten words are converted to typed text and added to the text box, the processors may change the location of a displayed cursor to a location after the location of the most recently added typed text. As the typed text is displayed within the text box, the processors may cause the corresponding handwriting (e.g., the corresponding word) to disappear.

In some instances, the processors may also cause an additional or "companion" toolbar to be displayed. The buttons of the toolbar may also enable the user to perform edits on the typed text without requiring the processors to call and display the virtual keyboard. The toolbar may include buttons including symbols such as an enter symbol to finish writing, an undo symbol to undo the last action, a redo symbol to redo the last action, a delete symbol to delete the last character, an emoji symbol to select an emoji, and a keyboard symbol to open a virtual keyboard. The user may select one of the buttons of the toolbar by tapping on that button with the tip of the stylus or a finger.

Once the user is finished writing, the user may be able to deactivate the writing mode and effectively cause the processors to close or remove the handwriting field. As such, the area of the handwriting field is no longer registered as a writable area. For instance, to deactivate the writing mode, the user may use the tip of the stylus or a finger to select a button with an enter or submit symbol in the toolbar, go to a new webpage, focusing on the launcher, or scroll.

The features described herein may provide an improved stylus-based human-computer device interface. For instance, prior systems may enable such features only with bulky and visually distracting virtual keyboards or popup boxes which may prevent a user from being able to view the entire display. Thus, the improved interface may provide for the technical solution of utilizing a handwriting field without visual impact on the display and thereby allowing for the seamless inputting of text into a text box using a stylus without such disadvantages. In addition, such features may provide the technical advantages of enabling the continued use of a stylus without having to switch inputs based on task type, such as text messaging, writing on a notepad (e.g., note taking) or a virtual "sticky" note, writing in a cell of a spreadsheet, or writing more sophisticated text editors such as those used for email or larger text files. Because of this, context switching, such as going from a clicking or scrolling task to a writing task and back, using a stylus may be particularly efficient and so may be quick and seamless for the user. Moreover, because the features described herein can be used with any number of different platforms or applications, more consistent stylus-based interaction may be provided across platforms. In other words, devices may function in a consistent manner (e.g., in relation to locations in which stylus-based writing can be performed, what editing capabilities are provided, how activation/deactivation of the feature can be performed, etc.). By bypassing the virtual keyboard and allowing a stylus to be used to write directly to the text box and reducing the need to tap buttons or making additional inputs, this may make the overall process of interacting via a stylus more efficient (and also quicker, more natural and more intuitive for the user) and thereby provide additional technical advantages. For instance, this may enable users to continue interacting with their device via their stylus, thereby providing an uninterrupted workflow, and a reduced amount of time spent on keystrokes.

Example Systems

Figure 2:
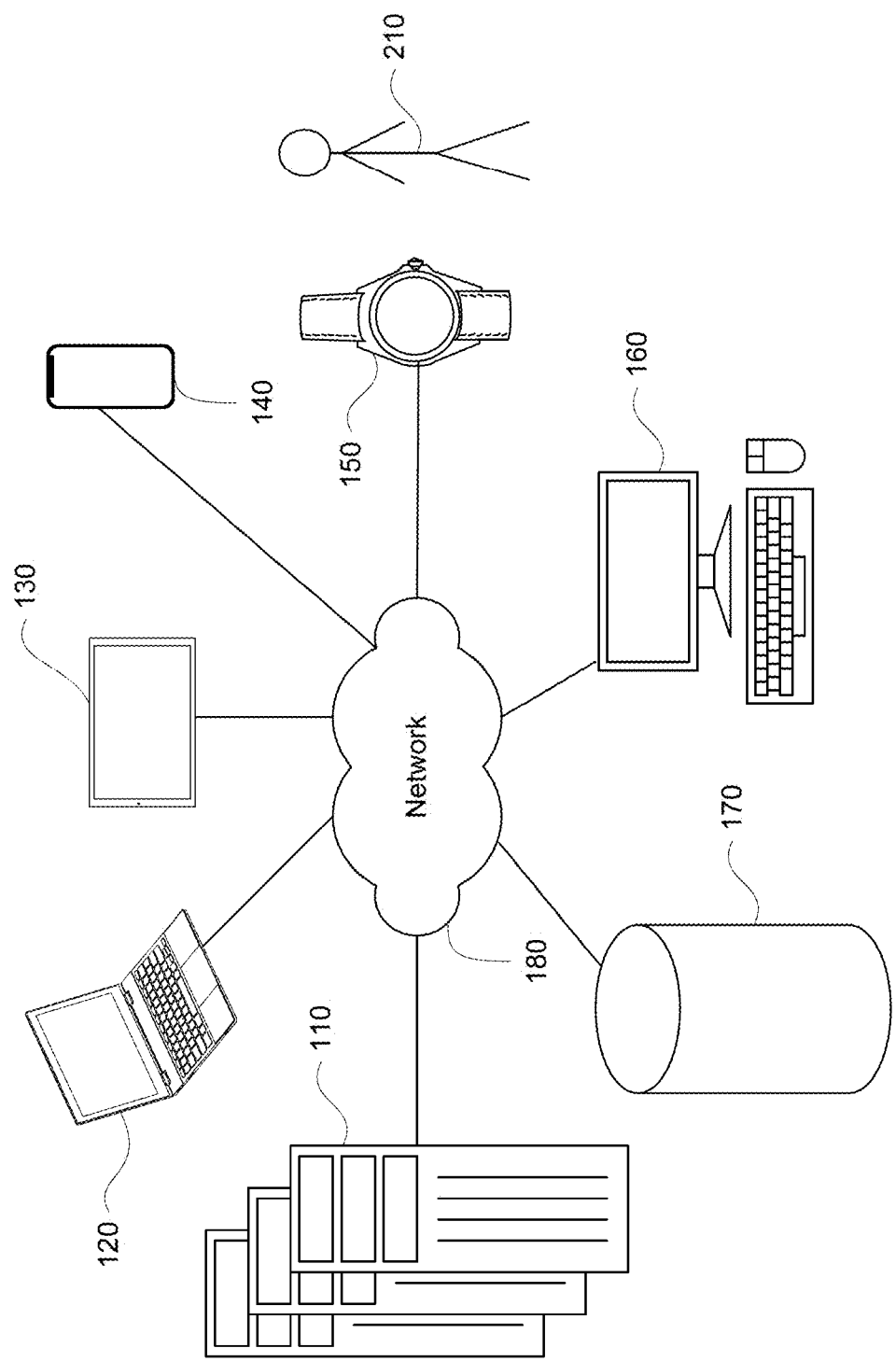
FIG. 2 is a pictorial diagram illustrating the example system in accordance with aspects of the disclosure.

FIGS. 1 and 2 illustrate an example system 100 in which the features described herein may be implemented. It should not be considered as limiting the scope of the disclosure or usefulness of the features described herein. In this example, system 100 can include computing devices 110, 120, 130, 140, 150, 160 as well as storage system 170. For example, as shown, each of these computing devices contain one or more processors 112, memory 114 and other components typically present in general purpose computing devices.

Memory 114 can store information accessible by the one or more processors 112, including instructions 116 that can be executed by the one or more processors 112. Memory can also include data 118 that can be retrieved, manipulated or stored by the processors 112. The memory 114 can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 1 functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of computing devices 140. Accordingly, references to a processor or computing device will be understood to include references to a collection of processors or computing devices or memories that may or may not operate in parallel. Although not necessary, any of the computing devices may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing devices 110, 120, 130, 140, 150, 160 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices. Accordingly, references to a processor, computer, computing device, or memory will be understood to include references to a collection of processors, computers, computing devices, or memories that may or may not operate in parallel. For example, the computing devices 110 may include a plurality server computing devices operating in a distributed system, etc. Yet further, although some functions described below are indicated as taking place on a single computing device having a single processor, various aspects of the subject matter described herein can be implemented by a plurality of computing devices, for example, communicating information over network 180.

Each of the computing devices 110, 120, 130, 140, 150, 160 can be at different nodes of a network 180 and capable of directly and indirectly communicating with other nodes of network 180. Although only a few computing devices are depicted in FIGS. 1 and 2, it should be appreciated that a typical system can include a large number of connected computing devices, with each different computing device being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 110, 120, 130, 140, 150, 160 may be configured similarly to one another, with one or more processors, memory and instructions as described above, but may be different types of devices. For instance, as shown in FIGS. 1 and 2, computing device1 110 may be server computing devices and may have all of the components normally used in connection with a server computer, such as processors, and memory storing data and instructions. As another example, computing devices 120, 130, 140, 150, 160 may each be a client computing device intended for use by a user, such as user 210 depicted in FIG. 2, and have all of the components normally used in connection with a personal computing device such as a central processing unit (CPU), memory (e.g., RAM and internal hard drives) storing data and instructions, input and/or output devices, sensors, communication module, clock, etc.

Although the computing devices 120, 130, 140, 150, 160 may each comprise a full-sized personal computing device, they may alternatively comprise mobile computing devices capable of wirelessly exchanging data with a server computing device, such as the computing devices 110, over a network such as the Internet. For instance, computing device 120 may be a laptop or netbook personal computer, computing device 130 may be a tablet personal computer, computing device 140 may be a mobile phone or other hand-held personal computing device, computing device 150 may be a wearable computing device such as a watch or head-mountable device (not shown), computing device 160 may be a desktop computer, or a mobile phone or a device such as a wireless-enabled PDA, a tablet PC, or a netbook that is capable of obtaining information via the Internet. For another instance, computing devices 120 and 130 may each be a wearable computing device, for example as shown in FIG. 2, computing device 120 may be a smartwatch, and computing device 130 may be a head-mountable device. Wearable computing devices may comprise one or more mobile computing devices that are configured to be worn by/attached to a human body. Such wearable computing devices may form part of an item of clothing and/or be worn over/under clothing. Further examples of wearable computing devices include gloves and/or one or more rings.

Figure 3:
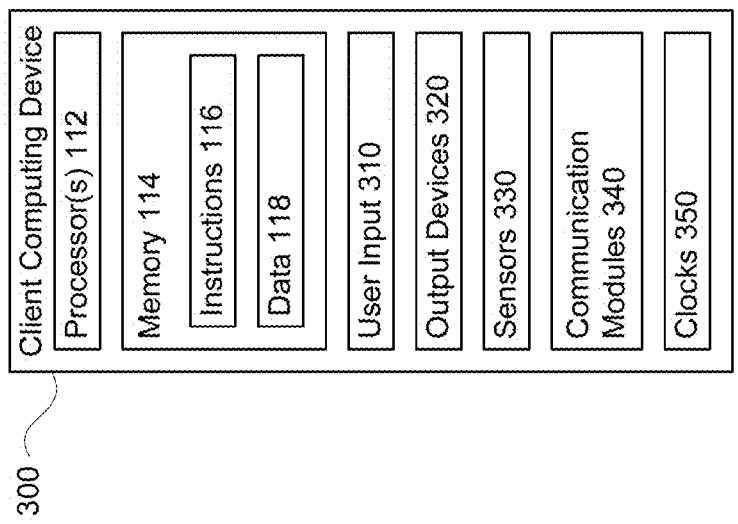
FIG. 3 is a functional diagram of an example computing device in accordance with aspects of the disclosure.

FIG. 3 provides a more detailed functional representation of a client computing device 300 which may correspond to any of the computing devices 120, 130, 140, 150, 160. In this regard, client computing device 300 may include one or more user inputs, such as user inputs 310. For instance, user inputs may include mechanical actuators, soft actuators, periphery devices, sensors, and/or other components. For example, mechanical actuators may include buttons, switches, etc. Soft actuators may include touch pads and/or touch screens which may also include conductive materials (e.g., copper or indium tin oxide) and circuitry which can be used to receive and measure electrical signals or fields (such as a capacitive touch screens) and sensors which can measure pressure on the surface of the touchpad and/or touch screen from a user's finger or via a stylus. Periphery devices may include keyboards, mouse, etc. Sensors for user inputs may include microphones for detecting voice commands, visual or optical sensors for detecting gestures, as well as any of a number of sensors, including those further described below.

Client computing device 300 may include one or more output devices 320. For instance, output devices may include a user display, such as a screen, a touch sensitive display (e.g., a touch screen), for displaying information or graphics to the user. Output devices may include one or more speakers, transducers or other audio outputs. Output devices may include a haptic interface or other tactile feedback that provides non-visual and non-audible information to the user.

Client computing device 300 may include one or more sensors 330. The type of sensors included in the computing devices may depend on the type of the computing device. For instance, these sensors may be attached to the device including a visual sensor, such as a single front-facing camera, and an audio sensor, such as a microphone.

In order to obtain information from and send information to remote devices, including to each other, client computing device 300 may include communication modules 340. The communication modules may enable wireless network connections, wireless ad hoc connections, and/or wired connections. Via the communication module, the computing devices may establish communication links, such as wireless links. For instance, the communication modules 340 may include one or more antennas, transceivers, and other components for operating at radiofrequencies. The communication modules 340 may be configured to support communication via cellular, LTE, 4G, WiFi, GPS, and other networked architectures. The communication modules 340 may be configured to support Bluetooth®, Bluetooth LE, near field communications, and non-networked wireless arrangements. The communication modules may support wired connections such as a USB, micro-USB, USB type C or other connector, for example to receive data and/or power from a laptop, tablet, smartphone or other client computing device.

Using their respective communication modules, one or more of the computing devices 120, 130, 140, 150, 160, 300 may be paired with one another for transmitting and/or receiving data. For example, wearable computing devices 150 may come within a predetermined distance of computing device 140, and may become discoverable by computing device 140 via Bluetooth®. As such, computing device 140 or computing device 150, may initiate pairing. Before pairing, user authentication may be requested by the computing device 140 or computing device 150. In some instances, two-way authentication may be required for pairing, where the user must authenticate the pairing on both devices to be paired, such as on both computing devices 140 and 150.

Figure 4:
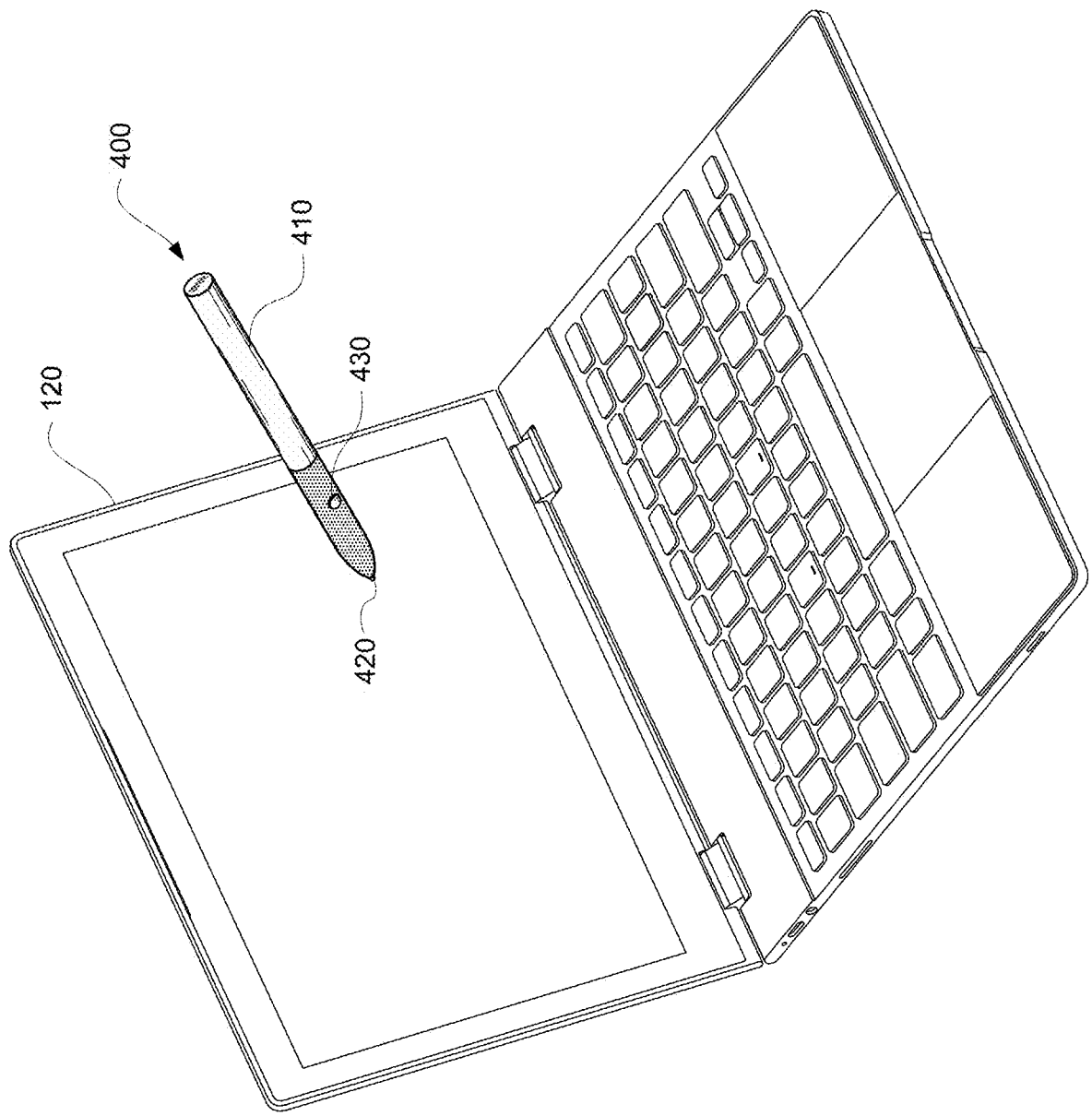
FIG. 4 is an example of a stylus and computing device in accordance with aspects of the disclosure.
Figure 5:
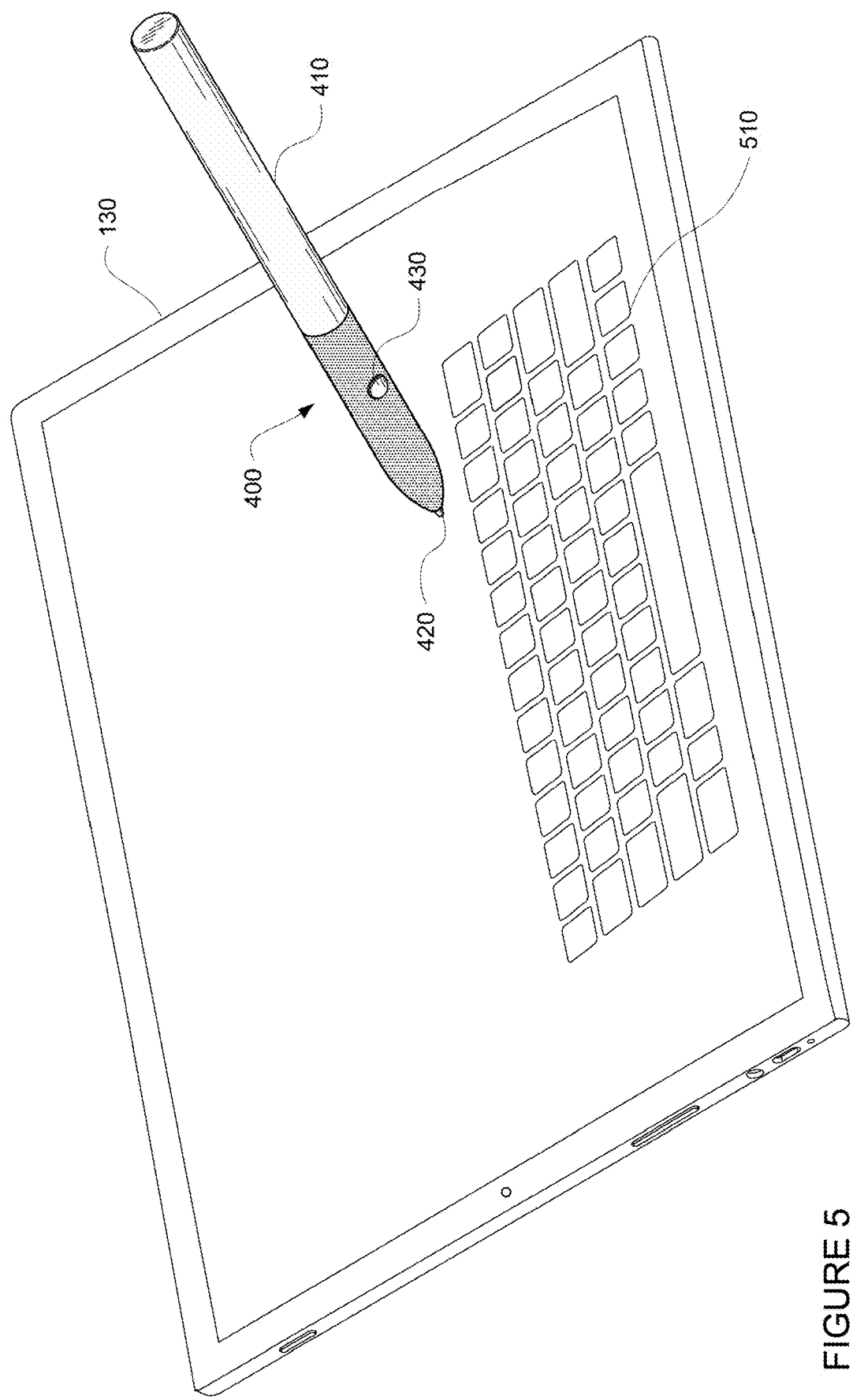
FIG. 5 is an example of a stylus and computing device in accordance with aspects of the disclosure.

Computing devices 120, 130, 140, 150, 160, may also be paired with peripheral devices such as keyboards, stylus, or other such devices in the same or a similar manner as described above. A stylus may include a device designed for use with user inputs such as buttons, touch sensitive displays (e.g., touch screens). FIGS. 4 and 5 depicts stylus 400 and a respective computing device with which the stylus may be paired, here computing device 120 in FIG. 4 and computing device 130 in FIG. 5. The stylus may include a body 410 shaped as a writing instrument such as a pen, pencil, crayon, etc. ending with a tip 420. Within the body may be a cavity for storing one or more batteries as well as circuitry for generating an electrical field or signal at the tip 420. The tip 420 may be formed from conductive rubber or capacitive hard plastic which when contact is made with a touch sensitive display of a client computing device may allow an electrical signal or field to pass from the stylus to a touch sensitive display device of a client computing device such as computing devices 120, 130, 140, 150, 160. In this regard, each of the computing devices 120, 130, 140, 150, 160 may be able to differentiate between inputs made by a stylus and inputs made by a user's finger (which may have different amounts of electric charge). In this example, the stylus 400 also includes a button 430 which may be used to enable pairing, powering the stylus on and off, or changing the functionality of the stylus.

The client computing device 300 may also include one or more internal clocks, such as clocks 350. The internal clocks may provide timing information, which can be used for time measurement for apps and other programs run by the computing devices, and basic operations by the computing devices, sensors, inputs/outputs, GPS, communication system, etc.

Returning to FIGS. 1 and 2, as with memory 114, storage system 170 can be of any type of computerized storage capable of storing information accessible by one or more of the computing devices 110, 120, 130, 140, 150, 160 (or client computing device 300) such as a hard-drive, memory card, ROM, RAM, DVD, CD-ROM, write-capable, and read-only memories. In addition, storage system 170 may include a distributed storage system where data is stored on a plurality of different storage devices which may be physically located at the same or different geographic locations. Storage system 170 may be connected to the computing devices via the network 180 as shown in FIG. 1 and/or may be directly connected to any of the computing devices 110, 120, 130, 140, 150, 160.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 25:
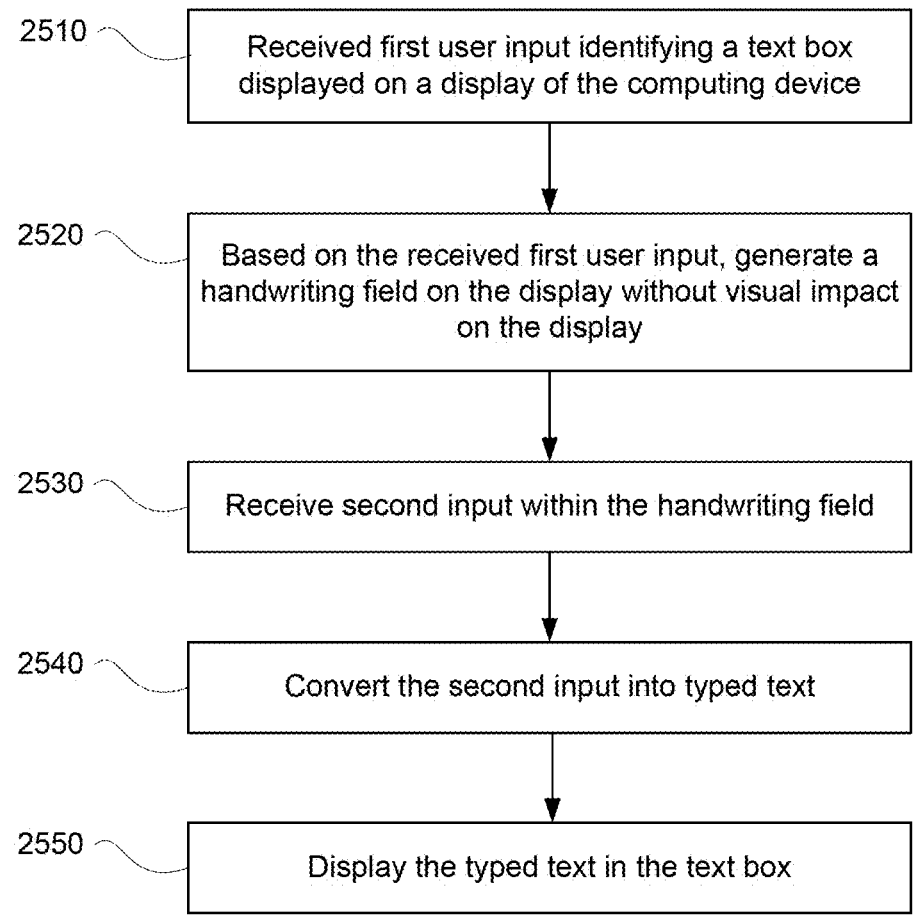
FIG. 25 is a flow diagram in accordance with aspects of the disclosure.

FIG. 25 is an example flow diagram 2500 which may be performed by one or more processors, such as the one or more processors 112 of any of the computing devices 120, 130, 140, 150, 160, (or client computing device 300) or other processors of other similar computing devices in order to allow a user to enter text into text boxes using a stylus, such as stylus 400. At block 2510, first user input identifying a text box is received on a display of the computing device. For instance, processors 112 of client computing device 300 may receive an input from a stylus of a user 210 on a touch sensitive display of the computing device. This input may essentially be recognized as a request to input text into the text box using the tip of the stylus and may therefore cause the processors to enable a writing mode as discussed further below. As such, processors 112 may control sensors 330 of client computing device 300 to collect sensor data on the motion of the tip 420 of the stylus 400 in order to detect handwriting input by the user.

Figure 6:
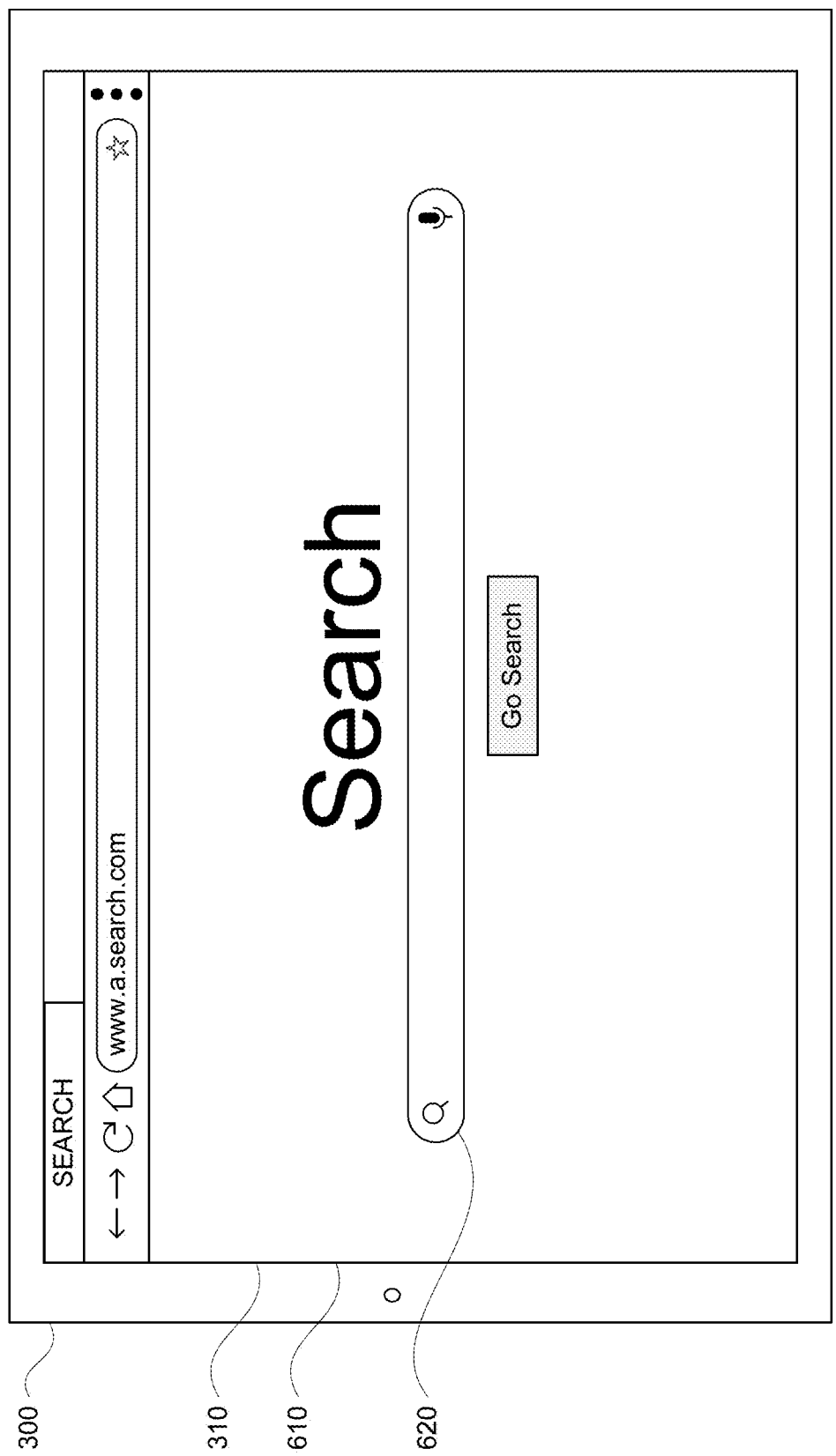
FIG. 6 is an example webpage displayed on a touch sensitive display of a computing device in accordance with aspects of the disclosure.

FIG. 6 is an example screen display including a webpage 610 with a text box (or text field) 620 which may be displayed, for example, on the touch sensitive display surface (here, also input inputs 310) of a client computing device 300 (here depicted as computing device 120). This webpage 610 or other information rendered on the screen may include various tags and information identifying different portions of the webpage, including text fields such as text boxes and cells of a spreadsheet application or other application or program. As shown in FIG. 6, the webpage may be a browser window. In this regard, the two-dimensional area of the text box 620 is readily identifiable by the processors 112.

Figure 7:
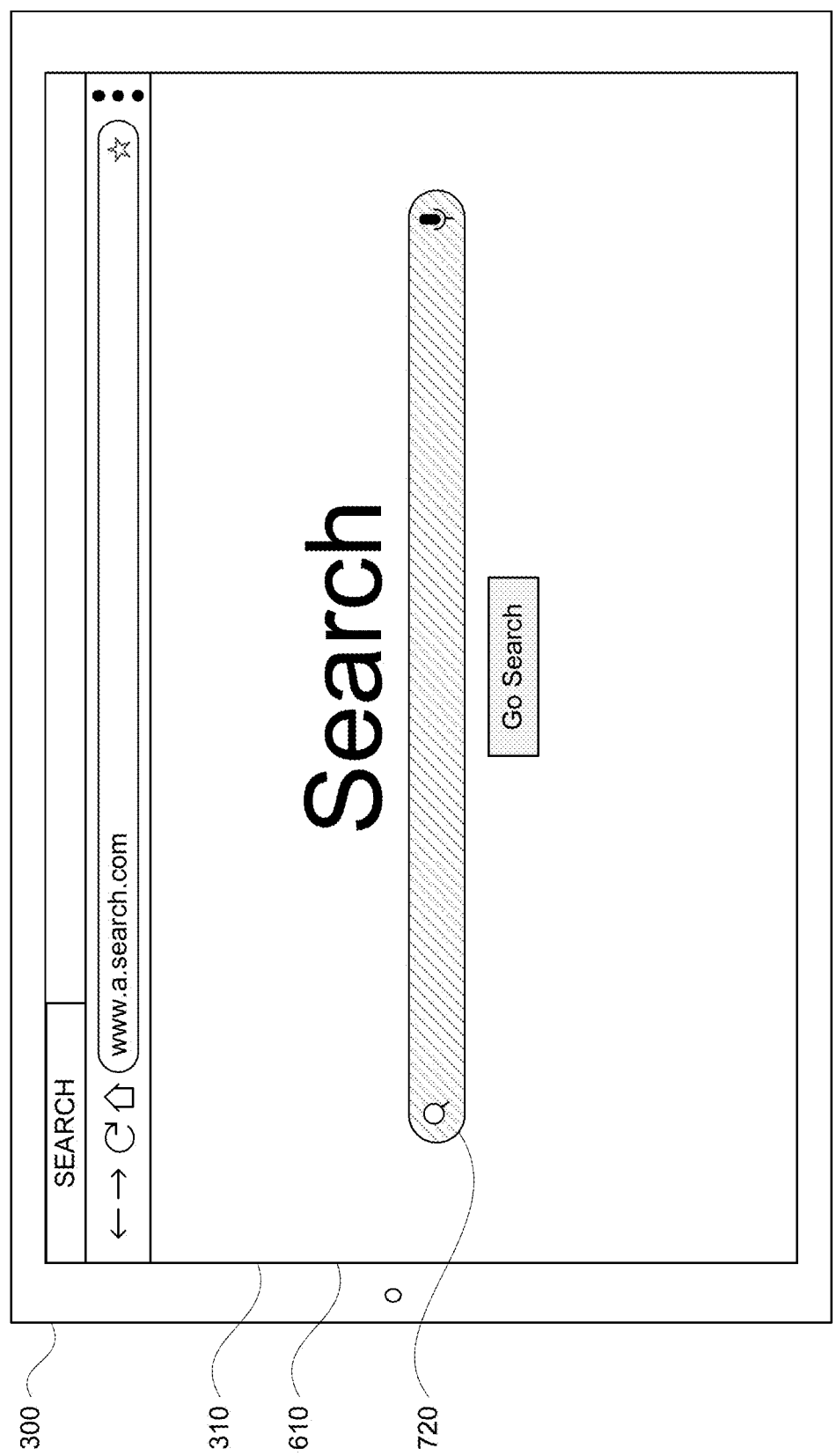
FIG. 7 is an example webpage displayed on a touch sensitive display of a computing device in accordance with aspects of the disclosure.
Figure 8:
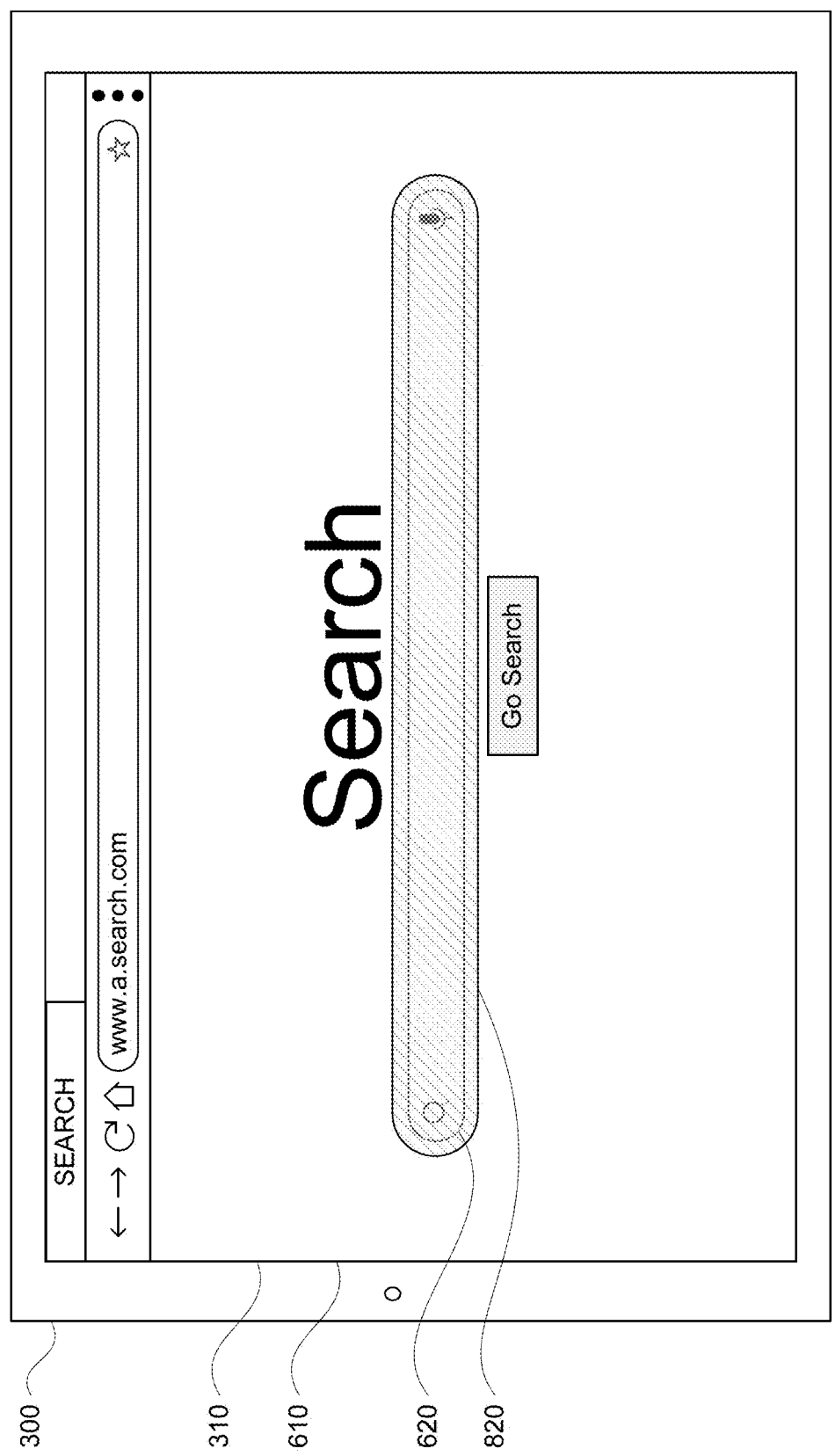
FIG. 8 is an example webpage displayed on a touch sensitive display of a computing device in accordance with aspects of the disclosure.

The user input may take any number of different forms. For instance, the first user input may include the user 210 using the tip 420 of the stylus 400 to tap on an area within a text box, such as the area 720 of text box 620 depicted in FIG. 7. In some instances, the user input may also identify the text box when the user 210 uses the tip 420 of the stylus 400 to tap on an area within or around within some predetermined distance such as 2 centimeters or more or less around all sides of the text box 620, represented by area 820 of FIG. 8. In this regard, the user need not be exactly within the text box 620 in order to identify that text box to the processors 112. Alternatively, the identification may be made by the user simply placing the stylus tip within the area of the text box or within the predetermined distance from the text box and dragging the stylus or beginning to write. This dragging may be any non-zero distance or for at least some other predetermined distance greater than zero and/or more than a tap. In some instances, so long as the initial point is within the text box or within the predetermined distance of the text box, the dragging or writing may extend beyond the text box or selectable area.

Returning to FIG. 25 at block 2520, based on the received first user input, a handwriting field is generated on the display without visual impact on the display. In this regard, the processors 112 may activate a writing mode which allows a user to make strokes within the handwriting field or "handwriting canvas" using the tip 420 of the stylus 400 in order to insert typed text into the text box. This handwriting field may also be associated with the text box such that input to the handwriting field is converted to text and the converted text displayed in the text box.

The handwriting field may be a two-dimensional field that is registered, flagged or otherwise tagged by the processors 112 as a "handwriting canvas" at which the processors 112 can expect to receive and display strokes made using the tip 420 of the stylus 400 on the touch sensitive display. The handwriting field may be "present" on the touch sensitive display but provided without visual impact on the display. In other words, the handwriting field may be invisible to the user, and unlike other systems which utilizes popup boxes for handwriting fields, the invisible handwriting field may not create an impediment to viewing (and interacting with) other information or images displayed on the display.

Figure 9:
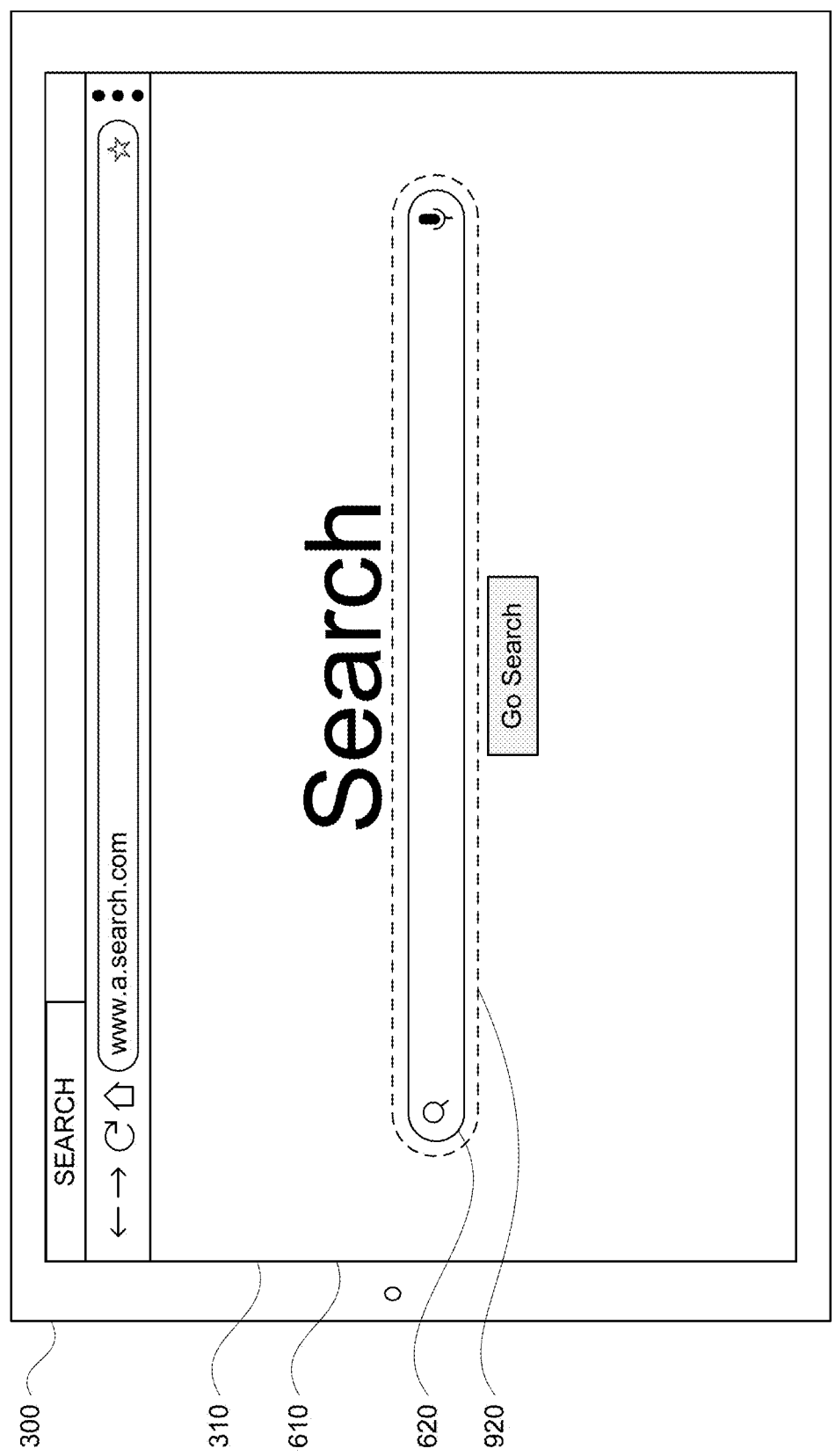
FIG. 9 is an example webpage and handwriting field displayed on a touch sensitive display of a computing device in accordance with aspects of the disclosure.
Figure 10:
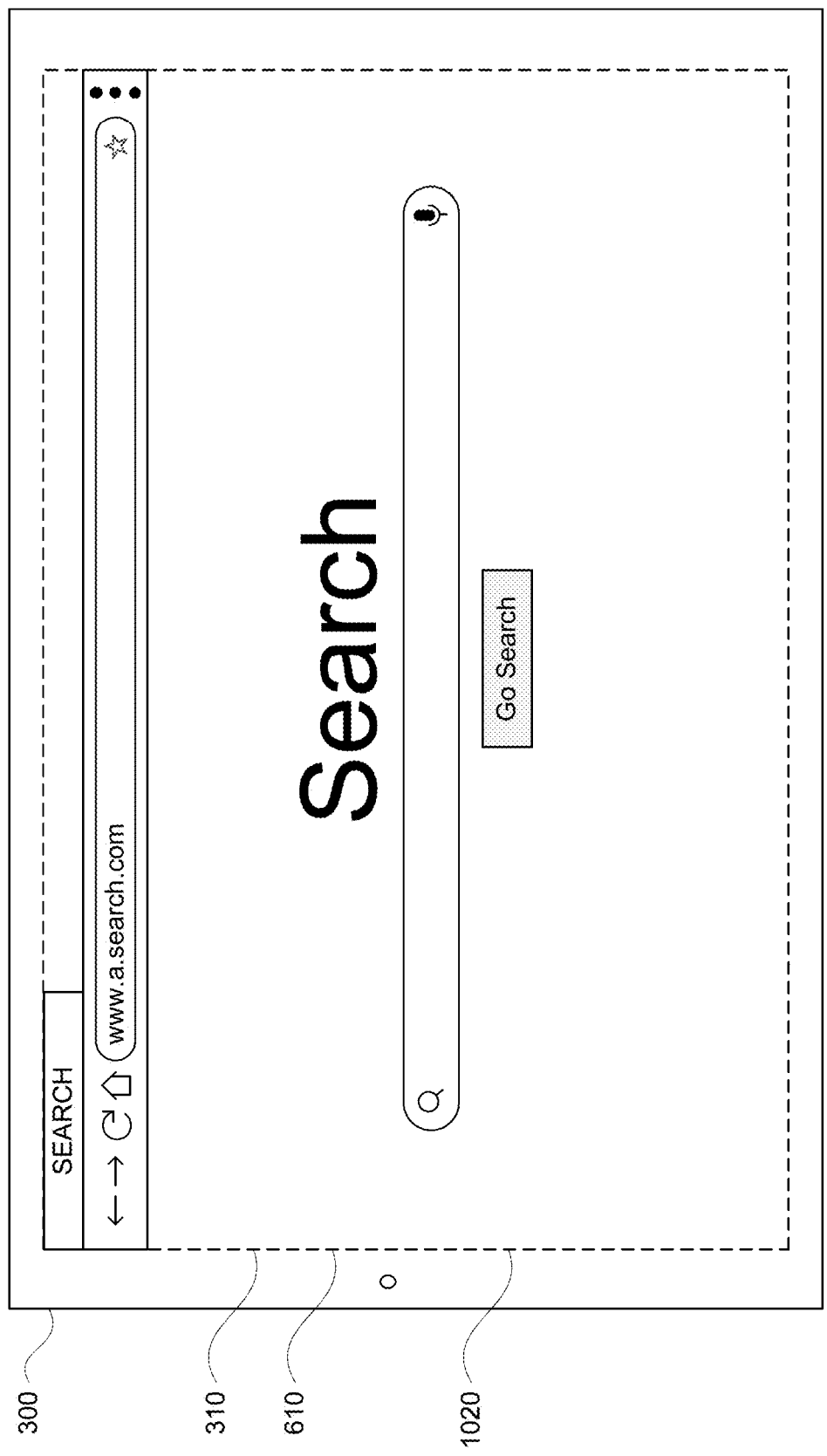
FIG. 10 is an example webpage and handwriting field displayed on a touch sensitive display of a computing device in accordance with aspects of the disclosure.

The handwriting field may be generated, at least initially, to correspond to the area of the identified text box or the area of the identified text box with the additional area within the predetermined distance from the text box. FIG. 9 includes the webpage 610 and depicts the outline of a handwriting field. In this example, the handwriting field generally corresponds to the area 820 of FIG. 8. Alternatively, the handwriting field may be generated to be the size of the entire display or touch sensitive display. For instance, A larger handwriting field that fills the entire display may provide the user with the ability to write more text without running out of room and may therefore provide a more user-friendly alternative to writing in a very small space, such as a short answer box on a survey. For instance, FIG. 10, includes the webpage 610 and depicts the outline of a handwriting field 1020 which corresponds to the boundaries of the input inputs 310 or rather, the entire area of the display.

Because the processors 112 are capable of differentiating between input made using the stylus 400 and input made using a finger, rather than generating a handwriting field when a text box is identified by a tap or swipe of a user's finger on the touch sensitive display, the processors 112 may instead call and display the aforementioned virtual keyboard (an example of which is represented by virtual keyboard 510 in FIG. 5). In this regard, the device may respond differently when a stylus is used as compared to when a finger is used. In addition, in instances where the virtual keyboard is already displayed, input from a stylus identifying a text box may cause the processors to remove the virtual keyboard, and generate a handwriting field as described further below.

Returning to FIG. 25, at block 2530, second input is received within the handwriting field. The user 210 may use the tip 420 of the stylus 400 to begin or continue writing within the area of the handwriting field. In response, corresponding markings may be displayed in the user's handwriting. In this regard, the handwriting field 920, 1020, 1120 may be an area in which strokes and taps using the tip 420 of the stylus 400 are automatically interpreted as handwriting and displayed as handwriting 1130 rather than being interpreted as "mouse tasks" like clicking. As the user writes, the processors 112 may display the handwriting 1130 before or as it is being processed into converted to typed text.

Figure 11:
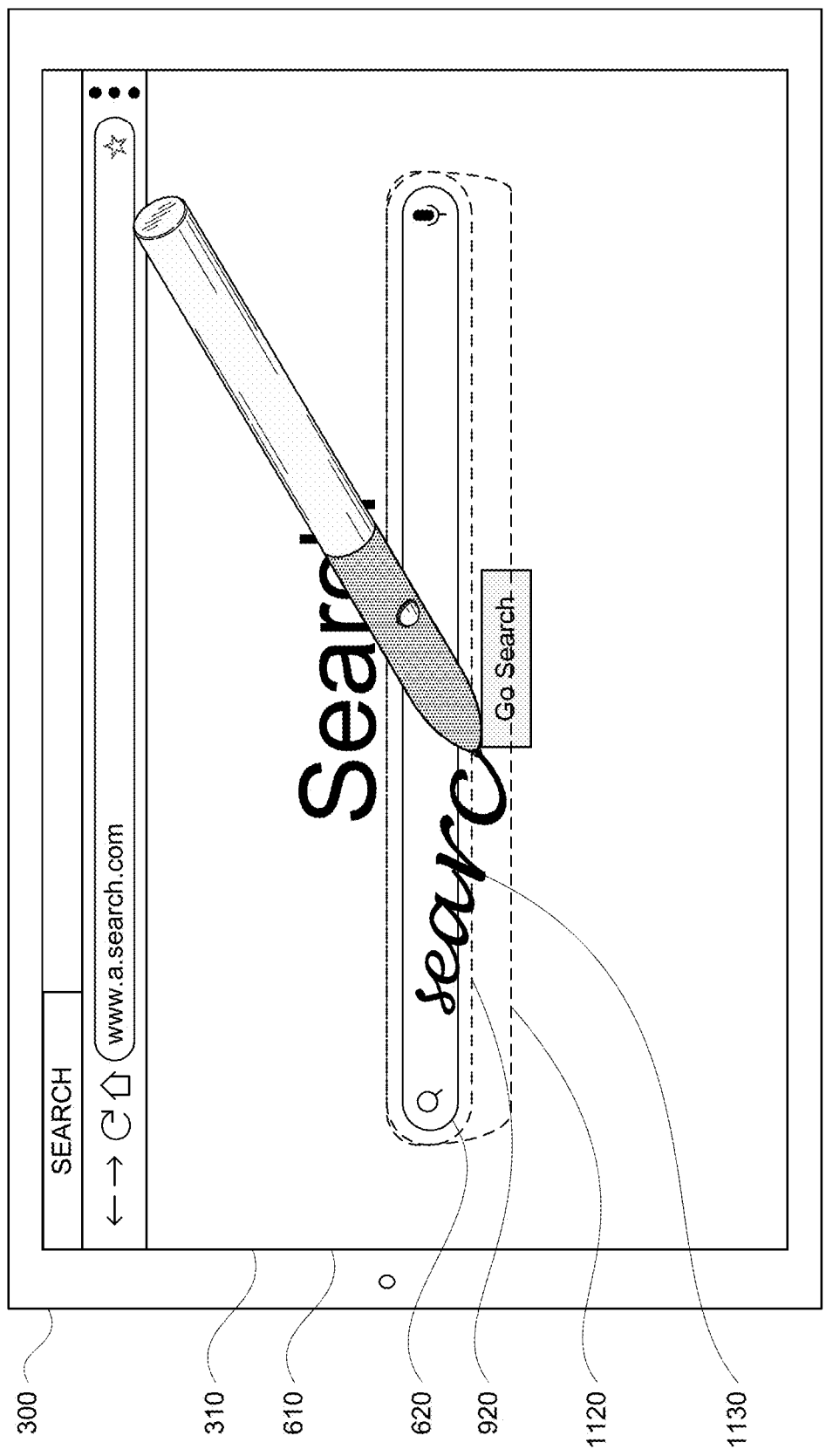
FIG. 11 is an example webpage, handwriting fields, and handwriting displayed on a touch sensitive display of a computing device and a stylus in accordance with aspects of the disclosure.

In some instances, as the user continues to write, the area of the handwriting field may be expanded towards the edge of the display in a direction corresponding to the direction in which the tip 420 of the stylus 400 is moving generally. For instance, FIG. 11 depicts a handwriting field that expands from the area of handwriting field 920 to the area of handwriting field 1120 as the user 210 uses the tip 420 of the stylus 400 to write the letters of the word "search" in handwriting 1130 (presented as partially written in FIGS. 11 and 12). In other words, one or more of the edges of the handwriting field may be adjusted by the processors in order to stay at least some distance away from the last in time point of contact of the tip 420 of the stylus 400 on the touch sensitive display. This may be determined, for instance, using a plurality of different types of information such as based on the size of the text box, the speed with which the tip 420 of the stylus 400 is moved across the touch sensitive display, the language direction (e.g. left to right, right to left, top to bottom, etc.), how often or where the user breaks each line to begin a new line beneath the prior line, timing (in microseconds measured, for instance, using clocks 350) of the last stroke or other contact with the tip 420 of the stylus 400, etc. In some instances, the size of the handwriting field may respond dynamically to changes in the size of the text box as well. For instance, some text boxes may increase in size as text is added. In such instances, the handwriting field may have a corresponding increase in size as well.

Figure 12:
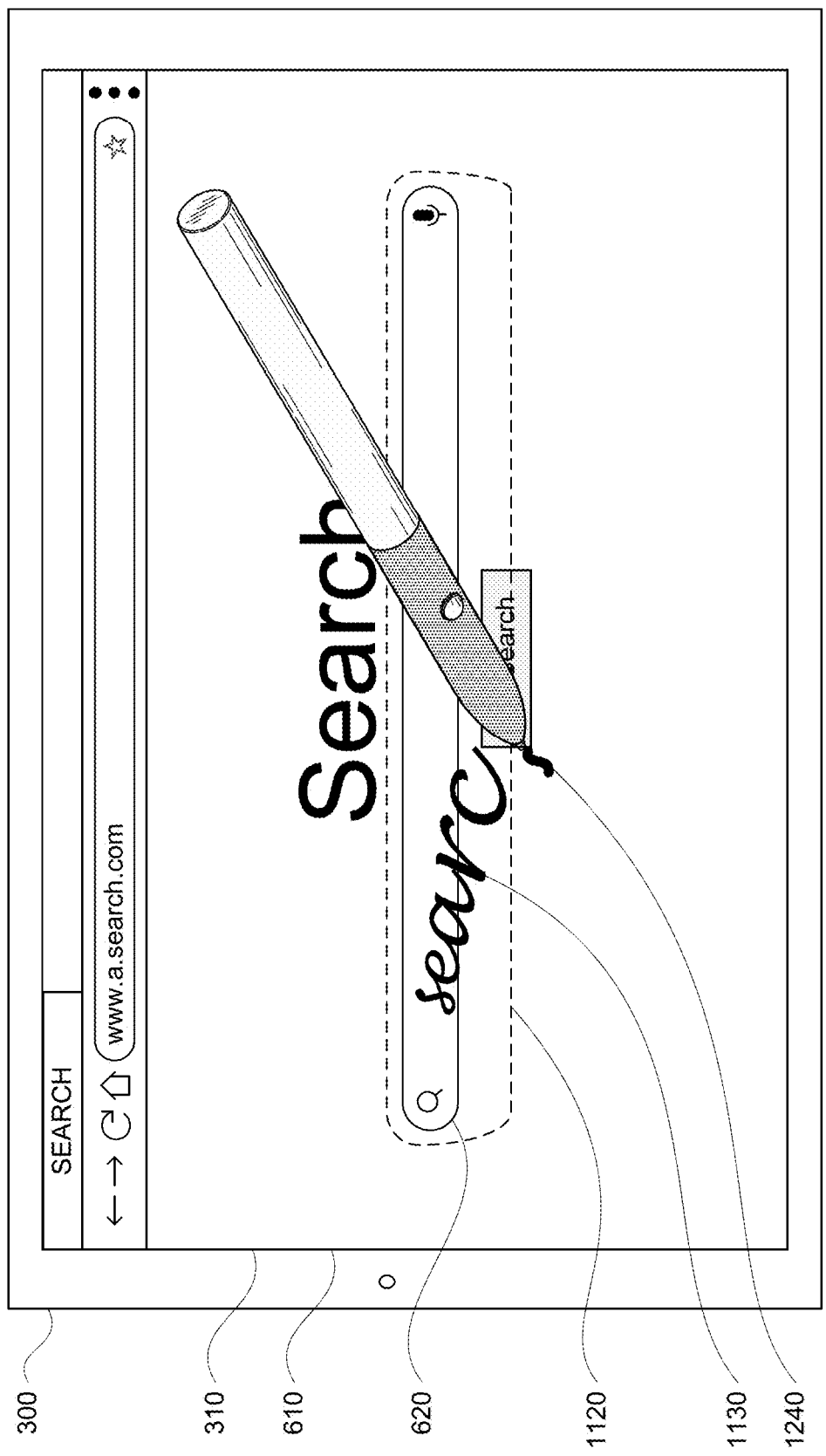
FIG. 12 is an example webpage, handwriting field, and handwriting displayed on a touch sensitive display of a computing device and a stylus in accordance with aspects of the disclosure.

In some instances, if there is input, such as strokes or taps (e.g., for a period or comma), outside of the handwriting field within a predetermined period of time from the last in time contact with the tip 420 of the stylus 400 within the handwriting field, this input outside of the handwriting field may be automatically captured by the processors and converted to typed text within the text box as well. This predetermined period of time may be selected from a range of a few microseconds to as long as a minute or more. FIG. 12 provides an example of an additional marking 1240 made outside of the (expanded) handwriting field 1120 which may be interpreted as part of the handwriting 1130 within the handwriting field if within the predetermined period of time from when the last stroke was made in the handwriting 1130.

Figure 13:
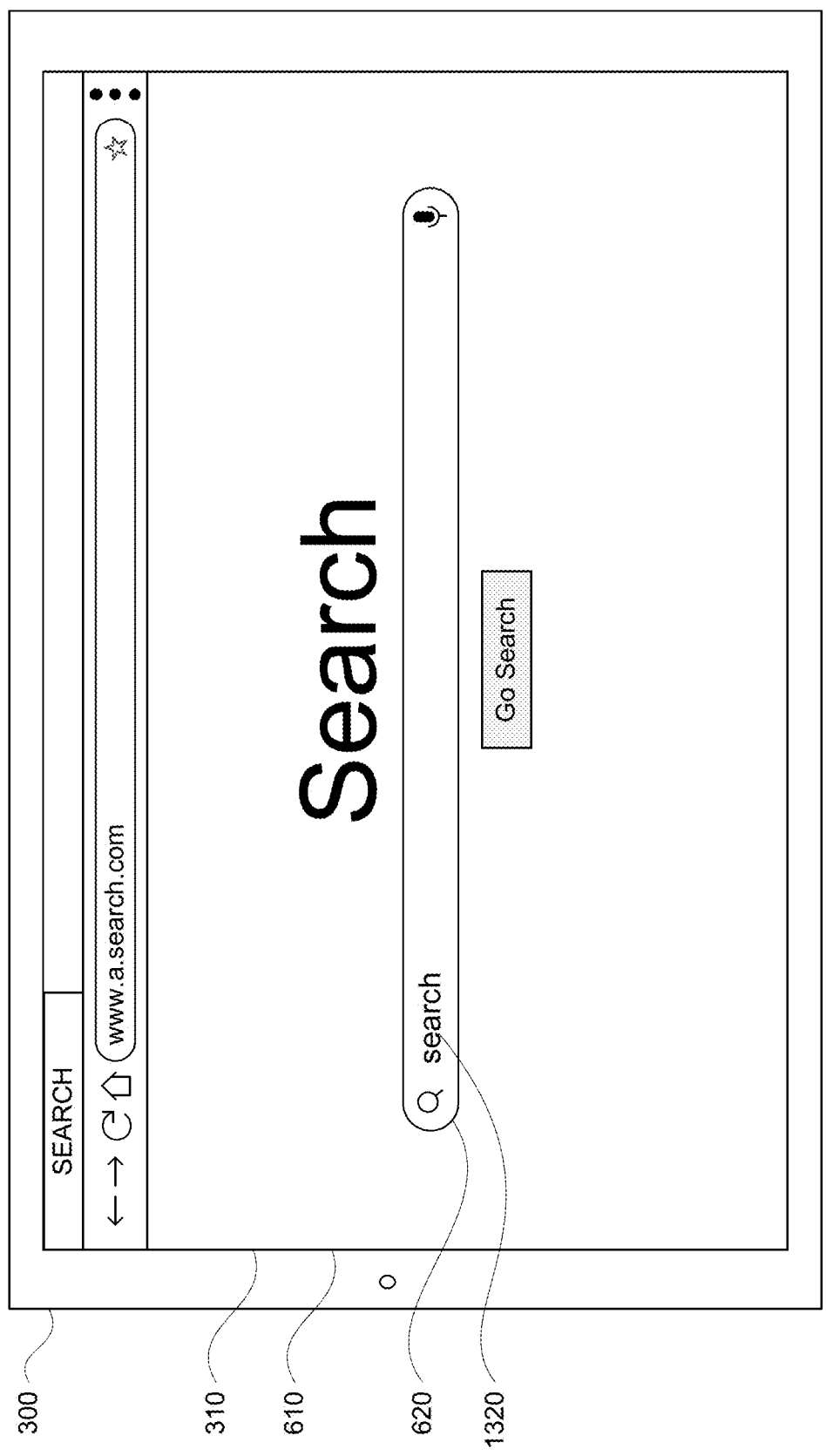
FIG. 13 is an example webpage and typed text in a text box displayed on a touch sensitive display of a computing device and a stylus in accordance with aspects of the disclosure.

Returning to FIG. 25, at block 2540, the second input is converted to typed text, and at block 2550, the typed text is displayed within the text box. For instance, turning to FIG. 13, once the user 210 has completed a word, here "search", this word may be converted to typed text 1320 and displayed in the text box 620. The conversion of the handwriting to typed text may be performed by the processors 112 using any known approaches, but may be performed in real time. For instance, such conversion may be performed using a machine-learning based model which may be run locally on the client computing device for improved privacy. In this regard, once a word is completed, it may be automatically converted to typed text, and the typed text displayed in the text box. This may occur instead of displaying a popup box or detached handwriting interface which requires the user to first confirm or accept the text by closing the detached handwriting interface or selecting some option (e.g., enter). As such, the handwriting 1130 (once completed) is automatically converted to typed text as the user writes, rather than having to first click submit, enter or use some other input to initiate the conversion. In addition, by utilizing the features described above, users do not first need to open the virtual keyboard 510 or another other application to be able to utilize the stylus 400 to add text to a text box. As such, users can write anywhere within or close to the text box 620 and automatically input information into the text box using the tip 420 of the stylus 400 rather than having to write within a detached handwriting interface.

Figure 14:
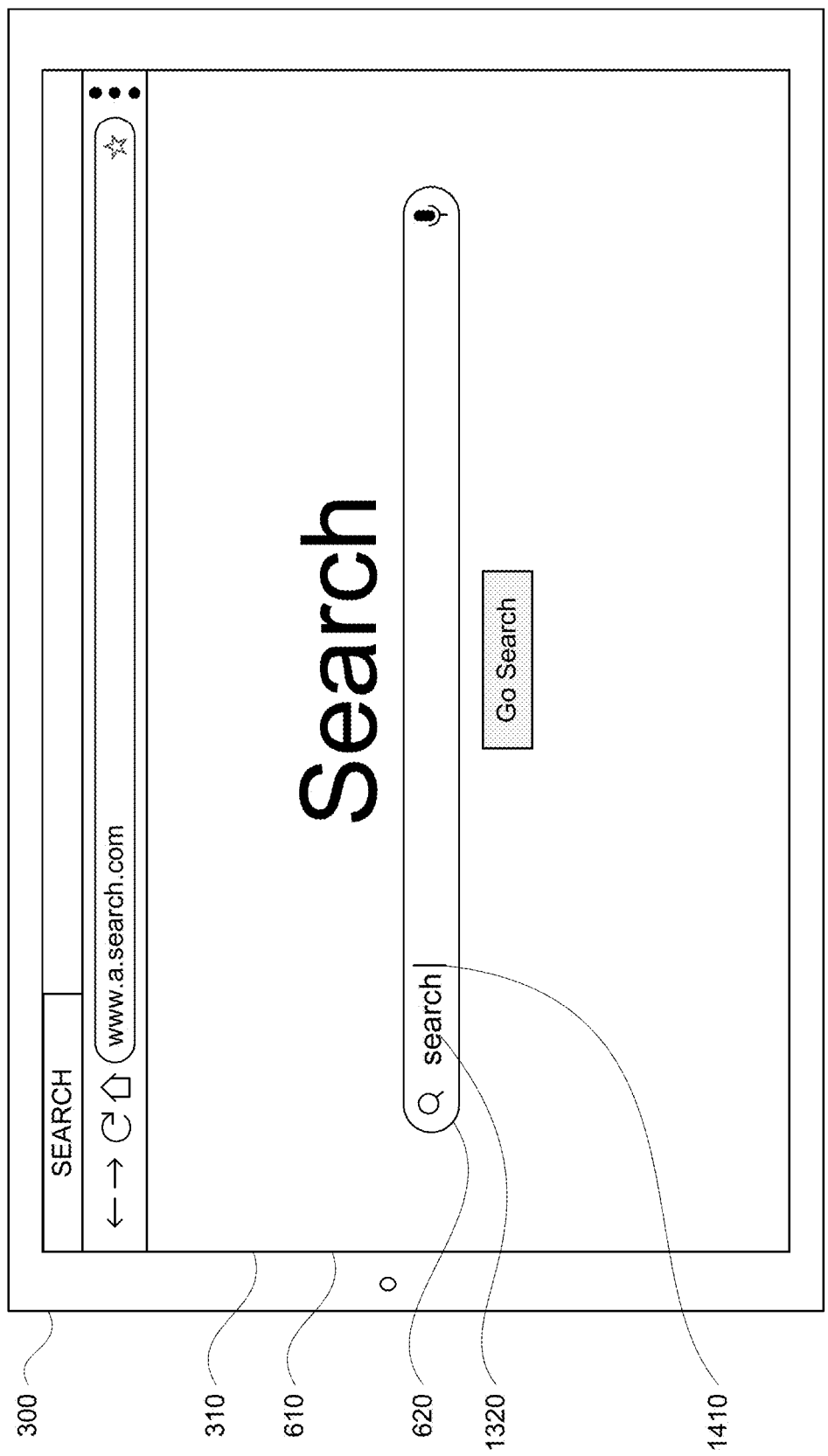
FIG. 14 is an example webpage as well as typed text and a cursor in a text box displayed on a touch sensitive display of a computing device and a stylus in accordance with aspects of the disclosure.

Once the typed text is converted, the processors 112 may display the typed text within the text box at the location of a cursor. In this regard, as the user continues to write and additional handwritten words are converted to typed text and added to the text box, the processors may move the location of a displayed cursor to the location after the location of the most recently added typed text. For instance, as shown in FIG. 14, a cursor 1410 is displayed after the handwriting 1130 is converted, and now displayed as typed text 1320. As additional words are written and converted to additional typed text in the text box 620, the cursor 1410 may be moved to a location after such additional typed text. As such, if the handwriting moves from left to right (e.g., English), the typed text may be added to the text box from the left to the right, and the cursor moved to the right. In this regard, if the handwriting moves from right to left (e.g., Arabic or Hebrew), the typed text may be added into the text box from right to left, and the cursor moved to the left. As each new word is added to the text box, a single space character (e.g., a blank space) may be added before or after that word. In this regard, if multiple words are converted to typed text at once, all such words should appear separated with a single space character.

As the typed text is displayed within the text box, the processors may cause the corresponding handwriting (e.g., the corresponding word) to disappear. This may happen at the same time (as one appears, one disappears). This change may appear to be instantaneous or may involve a brief animation that depicts the handwriting corresponding to the typed text fading away or fading into the typed text. For instance, the animation may include a simple fading out of the strokes of the handwriting or more complex animations where the handwriting shrinks slightly (e.g., to 80% of its size) and sliding towards the location of the cursor within the text box.

Moreover, once handwriting has disappeared, the area of that handwriting may no longer be considered writable by the processors. In some instances, where the handwriting field is expanded as the stylus moves towards edges of the handwriting field, once this expansion is completed or stopped (e.g., the edge of the display, webpage, or application window is reached or some other threshold is met), the user may have to begin writing again at the area of the text box. In addition, if the displayed information on the touch sensitive display is shifted, for instance in response to the user scrolling on a webpage, the processors may also shift the handwriting field accordingly. As such, any unconverted or currently displayed handwriting strokes may also shift accordingly. In other words, this shifting may keep the handwriting in the handwriting field anchored to specific items on the display rather than to an absolute position on the display. This may be more intuitive for some users as they may be better able to visually "track" the handwriting as it moves. Put another way, the handwriting may shift to a location that is more likely to be in the user's region of focus.

Figure 15:
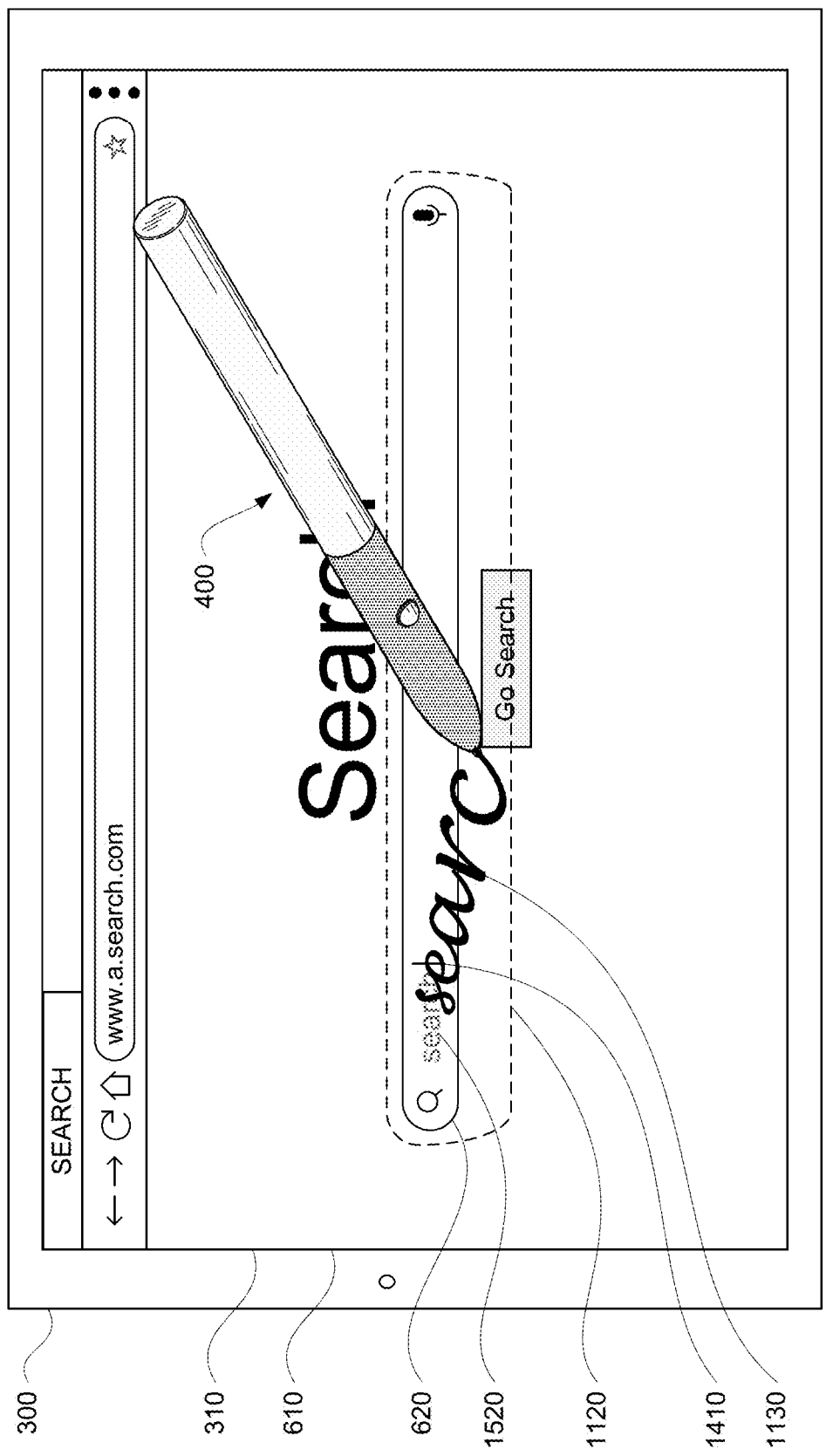
FIG. 15 is an example webpage, handwriting field, handwriting, preview typed text, and a cursor displayed on a touch sensitive display of a computing device and a stylus in accordance with aspects of the disclosure.

As the handwriting may be processed in real time, the processors may display a preview of the typed text within the text box. The preview may be considered the "best guess" for the current word that the user is writing using the tip of the stylus on the touch sensitive display. The preview may thus change as the user finishes each word. FIG. 15 provides an example of a preview 1520 of typed text from the converted handwriting 1130 within the text box 620. This preview of typed text may be distinguished visually from any prior typed text by being displayed in a faded or washed-out color. For example, if the typed text is displayed in black, the preview text may be displayed in a shade of gray that appears lighter than the black. Similarly, if the typed text is displayed in white, the preview text may be displayed in a shade of gray that appears darker than the white (while still distinguishable from the background).

Figure 16:
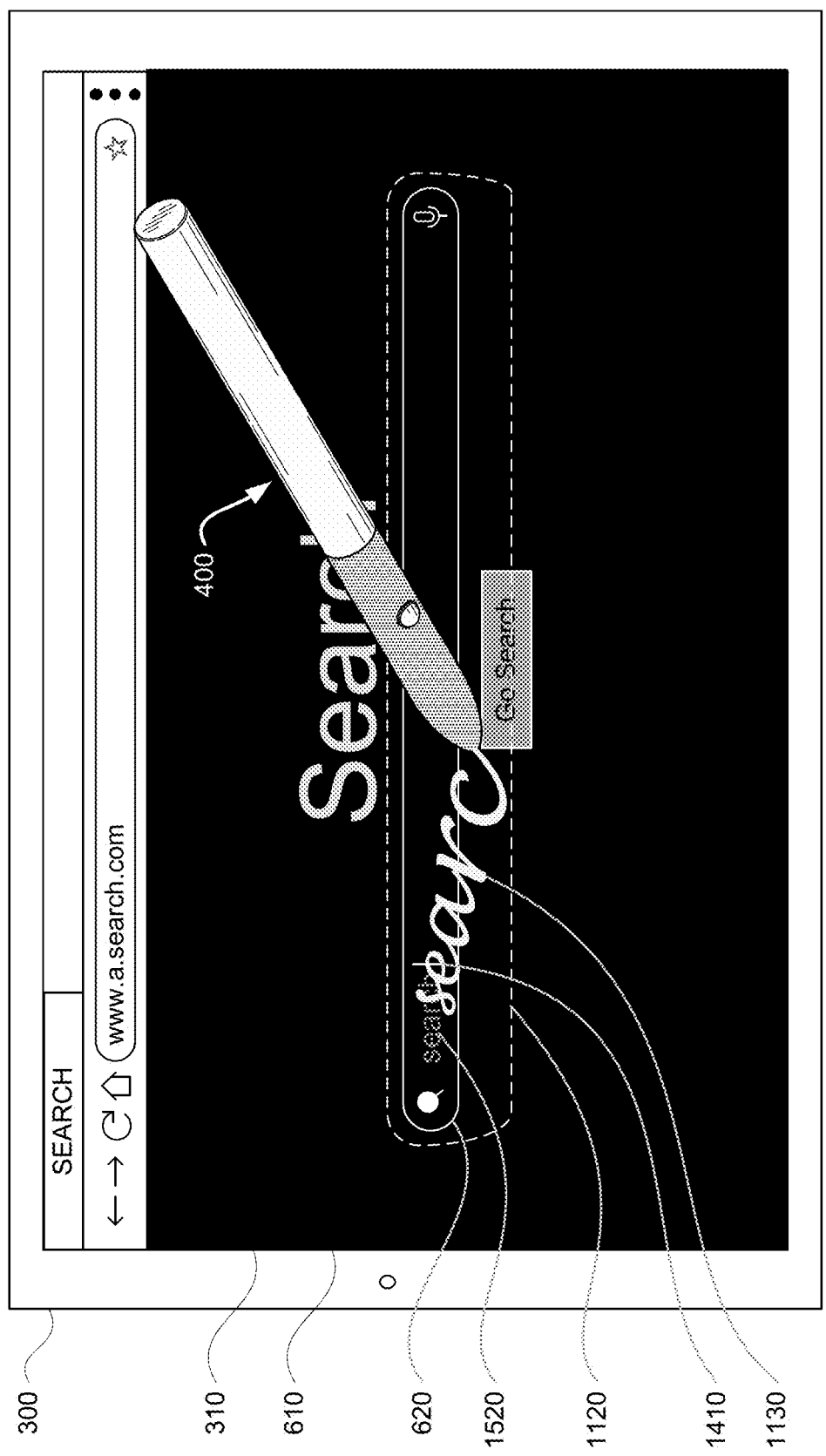
FIG. 16 is an example webpage, handwriting field, handwriting, preview typed text, and a cursor displayed on a touch sensitive display of a computing device and a stylus in accordance with aspects of the disclosure.
Figure 17:
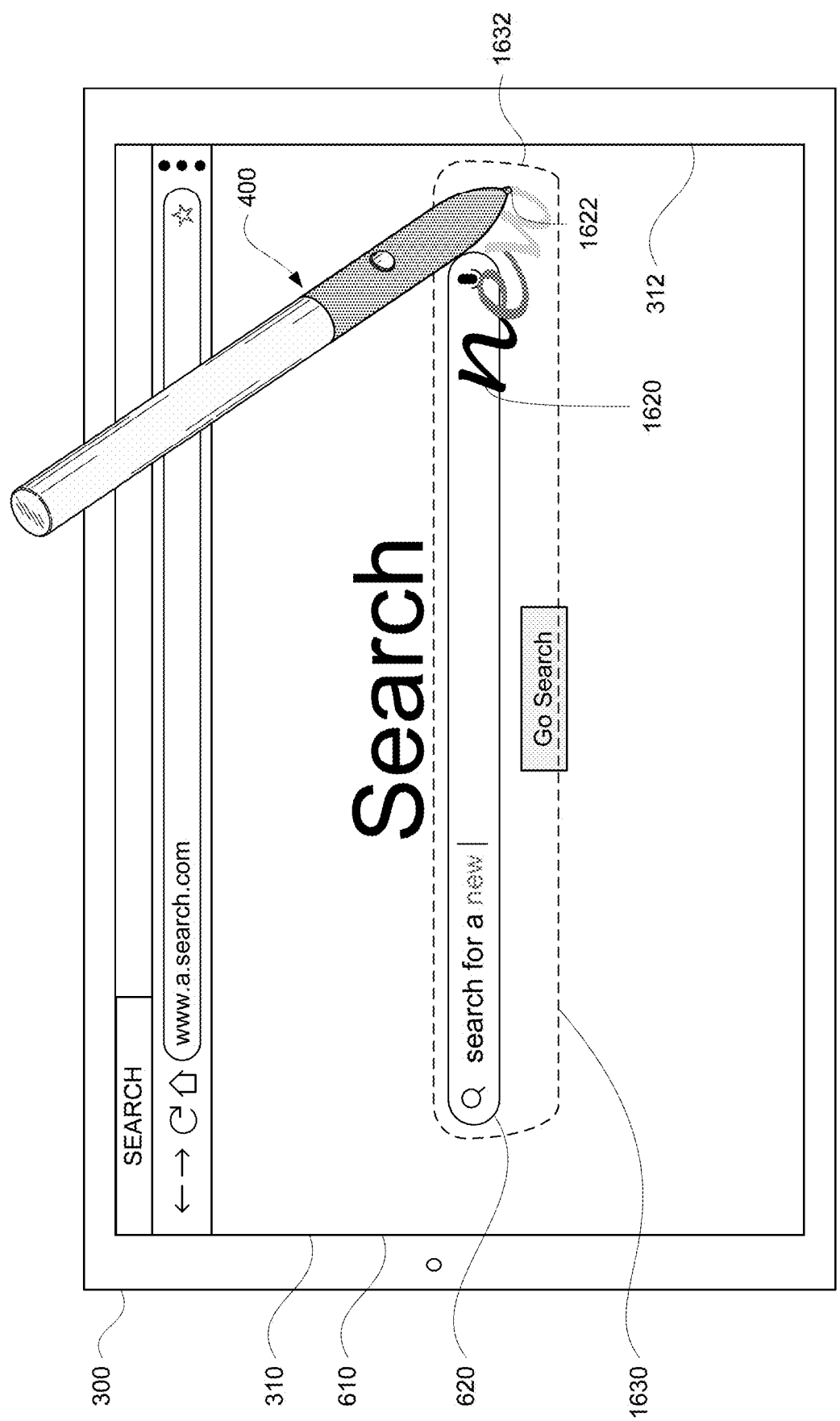
FIG. 17 is an example webpage, handwriting field, handwriting, preview typed text, and a cursor displayed on a touch sensitive display of a computing device and a stylus in accordance with aspects of the disclosure.

In this regard, after conversion, the typed text displayed in the text box by the processors may be displayed in a color that is visible on the current background of the display. In other words, the typed text may be in a color which contrasts with the color of the text box in order to make it easily readable for the user (e.g., black typed text on a white or light-colored text box or white or light-colored typed text on a black, blue or other dark colored text box). For example, FIG. 16 provides an example of such contrasting colors. In this example, the handwriting 1130 is shown in a color (white) that contrasts with the background of the webpage 610.

In some instances, as the tip 420 of the stylus 400 is moved close to the edge of the display and/or the edge of the handwriting field (if the size of the entire display or if already expanded to the edge of the display), the appearance of the handwriting may change. In other words, an appearance of the handwriting may be based on proximity to the edge of the handwriting field or the display of the computing device. This may serve to notify the user that the stylus is approaching the edge of the (invisible) handwriting field. The change may occur gradually as the stylus approaches the edge. In addition, or alternatively, in some examples, the appearance of only a portion of the handwriting that is relatively closer to the edge may be affected. In some examples, the color of the handwriting may change. For instance, the processors 112 may cause the handwriting color to appear to fade from black to lighter gray or from white to darker gray (depending on the color of the display beneath the handwriting field in order to maintain some contrast). For example, turning to FIG. 16, handwriting 1620 is close to an edge 1632 of a handwriting field 1630 and an edge 312 of the user inputs 310 (touch screen). The edge portions 1622 of the handwriting 1620 closest to these edges has begun to fade. In this regard, the "w" (which is closest to edges 312, 1632) is displayed in a color that is lighter than the "e", which is displayed in a color that is lighter than the "n".

In some instances, while writing, the user may be able to vary the user's stroke width based on the amount of pressure applied on the touch sensitive display using the stylus. As such, if the user applies more pressure, the handwriting may be thicker, and if the user applies less pressure, the handwriting may be thinner.

Figure 18:
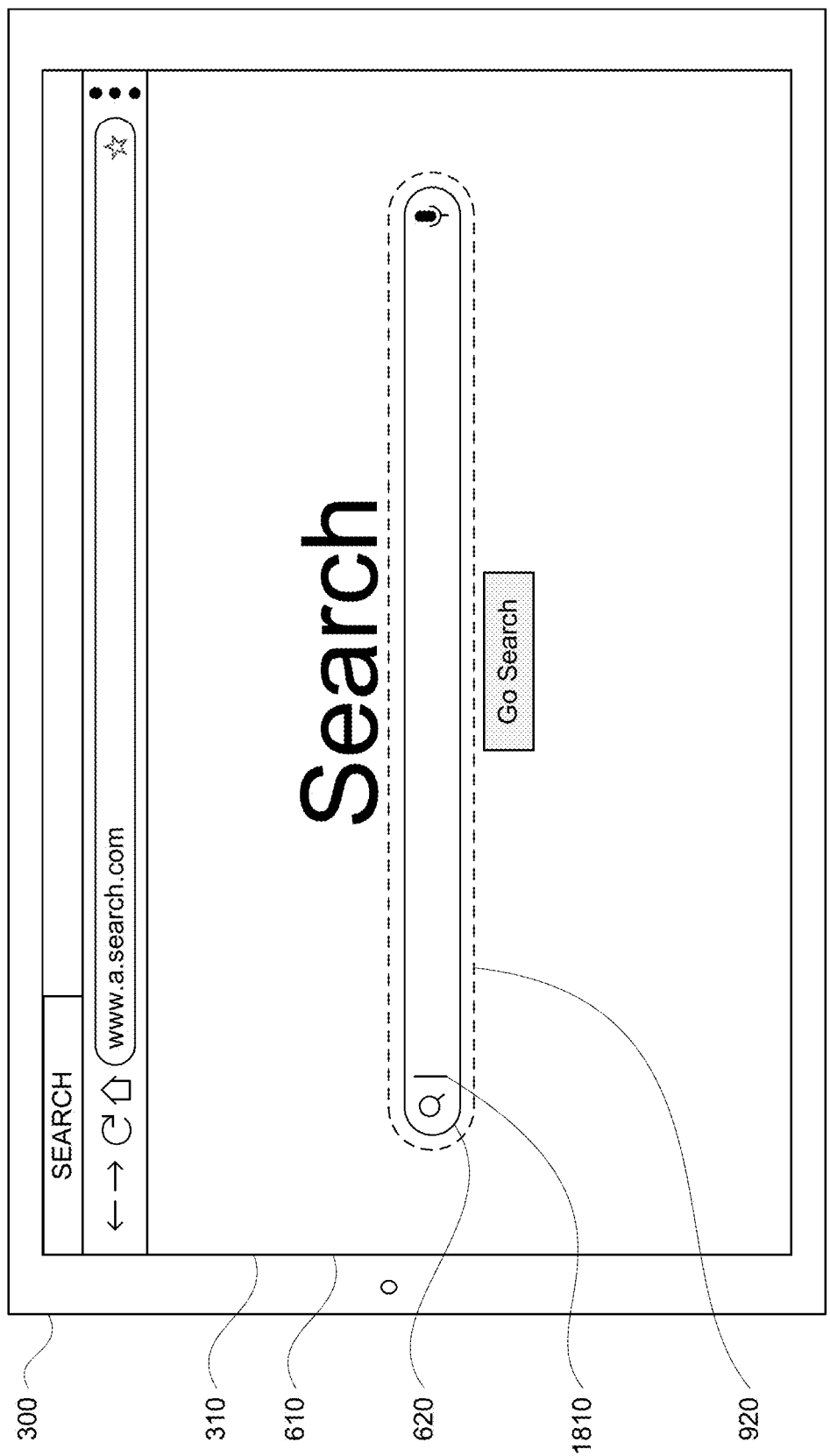
FIG. 18 is an example webpage, cursor, and handwriting field displayed on a touch sensitive display of a computing device in accordance with aspects of the disclosure.

In some instances, once the text box is identified and/or the handwriting field generated, the processors may provide some signal to the user that the writing mode is active and the user is now able to use the stylus to enter text into the text box. For instance, the processors may cause a cursor to appear in the text box adjacent to a left or right edge of the text box and may blink or flash in order to indicate to the user 210 that the writing mode has been activated. For instance, FIG. 18 includes an example of a cursor 1810 being displayed in the text box 620 immediately after the text box is identified and a handwriting field generated (here handwriting field 920) as described above. Although not depicted, this cursor may also be flashing (appear and disappear consecutively) to indicate user 210 that the writing mode has been activated.

Figure 19:
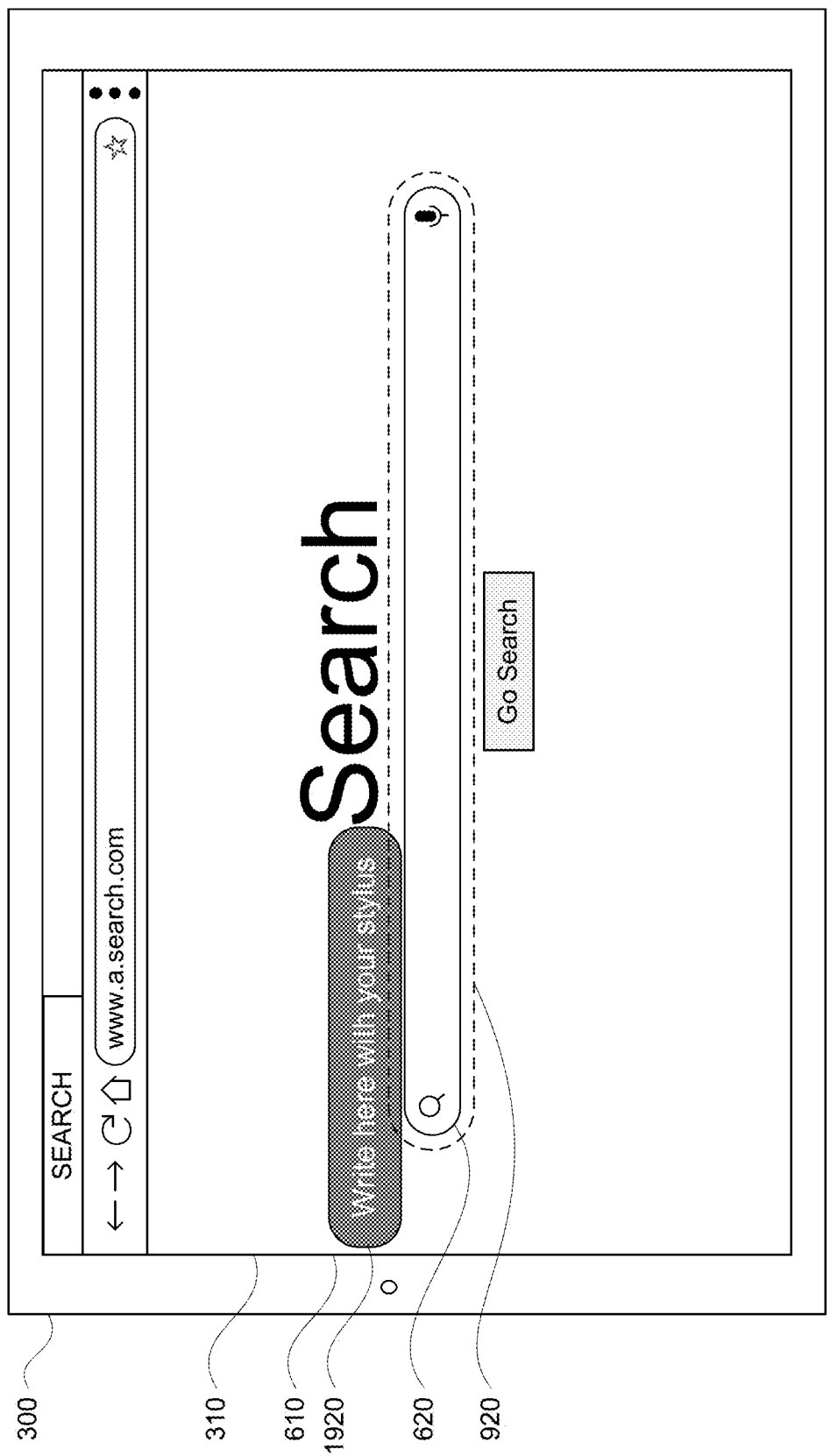
FIG. 19 is an example webpage, cursor, and handwriting field displayed on a touch sensitive display of a computing device in accordance with aspects of the disclosure.

In some instances, the processors may also cause a popup box to appear with a message to indicate that the writing mode has been activated, for example, by displaying a text notification. For instance, FIG. 19 includes an example of a popup 1920 which provides a text notification "Write here with your stylus" to indicate to the user 210 that the writing mode is now active. Such a popup may be especially useful in instances where the user has not previously entered text into the text box.

In other instances, if the text box already contains text, tapping with the stylus on the text box may cause the processors to display a blinking or flashing cursor at the end of the text within the text box by default, for instance as depicted in the example of FIG. 14 and cursor 1410. In this way, the user is able to continue to add text to the end of the text in the text box by writing within the handwriting field.

In some situations, it may be inappropriate to allow a user to use handwriting to enter text into certain text boxes or fields. In this regard, rather than providing a signal to the user that the writing mode is active and the user is now able to use the stylus to enter text into the text box, when such text boxes are identified as described above, the processors may provide a notification to a user to indicate that the writing mode is unavailable. This may be especially useful in situations in which the desired text to be entered is not discrete words, such as text boxes or fields for entering passwords or other private information.

Figure 20:
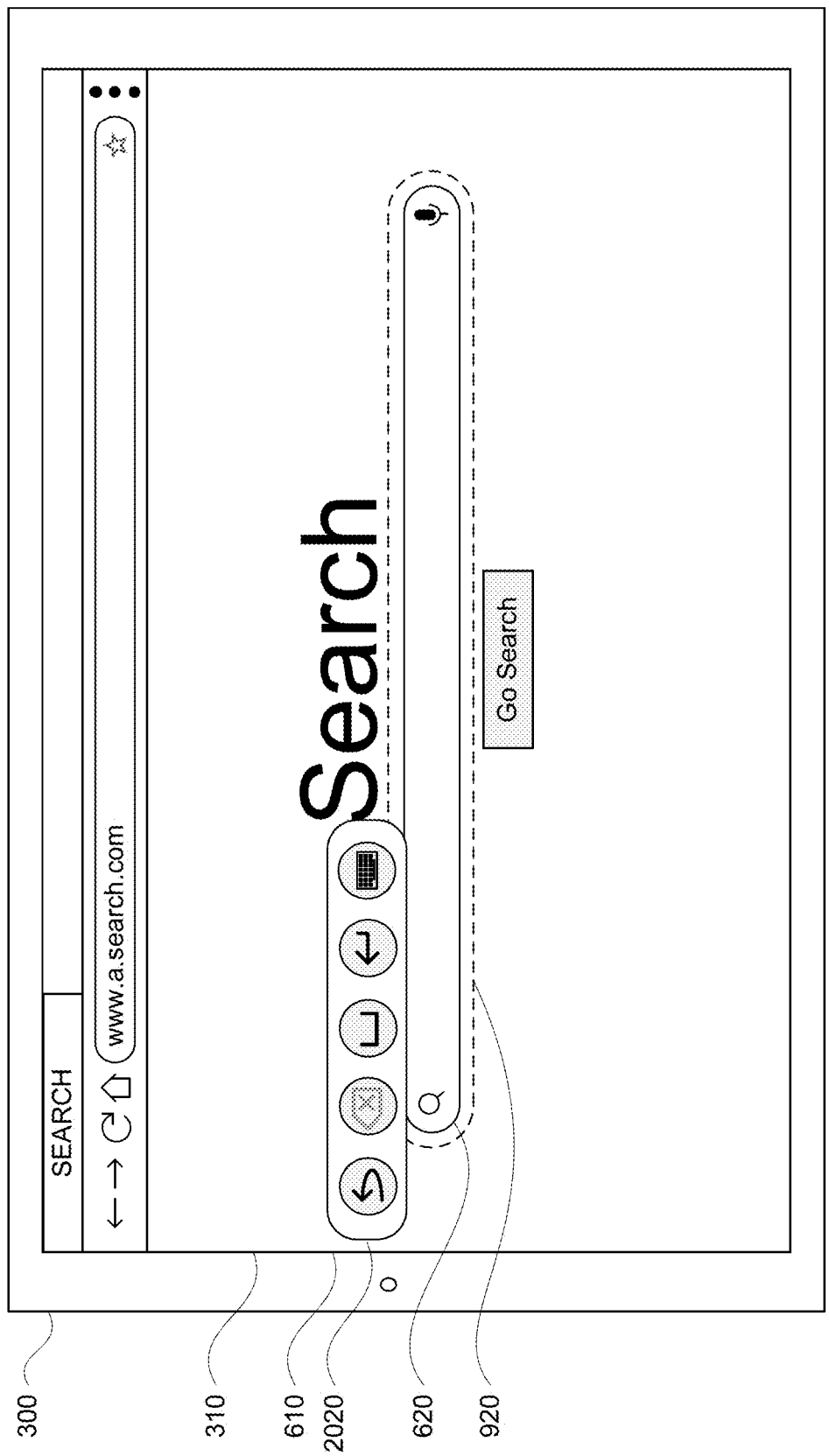
FIG. 20 is an example webpage, toolbar, and handwriting field displayed on a touch sensitive display of a computing device in accordance with aspects of the disclosure.
Figure 21:
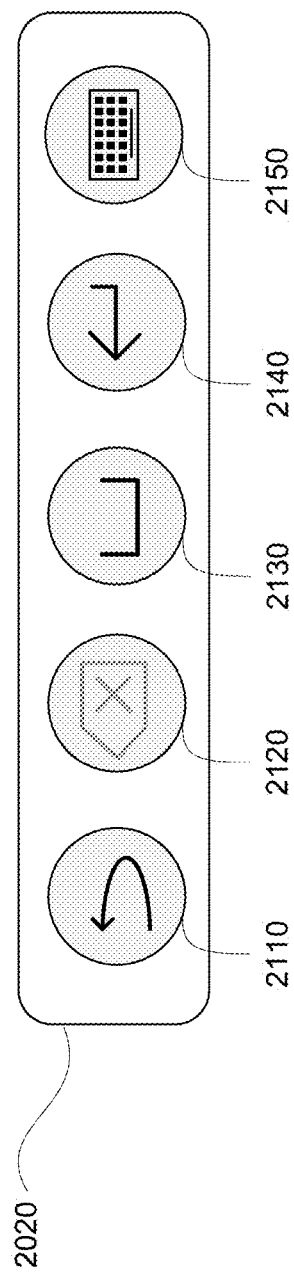
FIG. 21 is an example toolbar in accordance with aspects of the disclosure.

In addition, or alternatively, the processors may also cause an additional or "companion" toolbar to be displayed. The toolbar may display a number of selectable buttons or options, at least some of which may allow the user to perform edits on the typed text and/or perform additional functions without requiring the processors to call and display the virtual keyboard. FIG. 20 provides an example of webpage 610 after the text box 620 has been identified. In this example, a toolbar 2020 is displayed. FIG. 21 provides a detailed view of the toolbar 2020. In this example, the toolbar 2020 includes a plurality of selectable buttons 2110, 2120, 2130, 2140, 2150 or options. In this example, the toolbar is oriented horizontally. The buttons or options are arranged side to side. In other examples, the toolbar and/or the options may be oriented or arranged differently. In the specific example shown, the toolbar is a rounded rectangular container, but in other examples may have a different appearance. The buttons or options of the toolbar may enable the user to perform edits on the typed text and perform additional functions without requiring the processors to call and display the virtual keyboard. For instance, button 2110 includes an undo symbol, button 2120 includes a delete symbol, button 2130 includes a space symbol, button 2140 includes an enter symbol, and button 2150 includes a keyboard symbol. Selection of each of these buttons may cause the processors 112 to perform different functions.

For instance, selecting the button 2110 with the undo symbol may cause the processors to undo the most recent action, either button press or stroke made with the tip of the stylus. If the most recent action was handwriting, selecting the button with the undo symbol may cause the processors to remove the last stroke that was used in a word converted to typed text and/or delete that typed text. In this regard, the undo button may ignore or not apply to handwriting that has not been converted to typed text. If there was no recent action (such as when the user has written nothing upon first interacting with a text box), then the button for undo symbol and action may be inactive or unavailable and displayed accordingly, for instance by being "grayed out" as shown in FIGS. 20 and 21.

Selecting the button 2120 with the delete symbol may cause the processors 112 to delete the last character appearing in the text box (e.g., a backspace function). Selecting the button 2130 with the space symbol may cause the processors 112 to insert a new space at the location of the cursor within the text box. Selecting the button 2140 includes an enter symbol which may cause the processors 112 to perform a task such as submitting a search based on the typed text within the text box, add a paragraph break within the text box, or deactivate the writing mode. Selecting the button 2150 may cause the processors to call and display the virtual keyboard 510 (as shown in FIG. 5). Other buttons, not depicted, may also include a button with an emoji symbol to cause the processors to call and display a plurality of emojis (an emoji menu) to allow the user to select and add an emoji to the text box as well as button with a redo symbol to cause the processors to redo the last action within the text box.

As with the example of selecting the button 2110 with the undo symbol, selecting the button with the redo symbol may cause the processors to revert the typed text back to its last form before the undo button was selected. In this regard, if there was no recent undo action, then the button for the redo symbol and action may be inactive or unavailable and displayed accordingly, for instance by being "grayed out."

The user may select one of the buttons of the toolbar by tapping (single or double) on that button with the tip of the stylus or a finger. In some instances, confirmatory feedback may be provided by the processors, such as a unique sound or series of sounds, may be played through speakers of the device in order to indicate to the user that the button has been selected and a corresponding action has been performed. In some instances, selecting different buttons may result in the processor providing different sounds so as to allow the user to differentiate between such corresponding actions. In this regard, the sounds made in response to the user selecting the button with the undo symbol may be distinguished from sounds made in response to the user selecting the button with the redo symbol.

Figure 22:
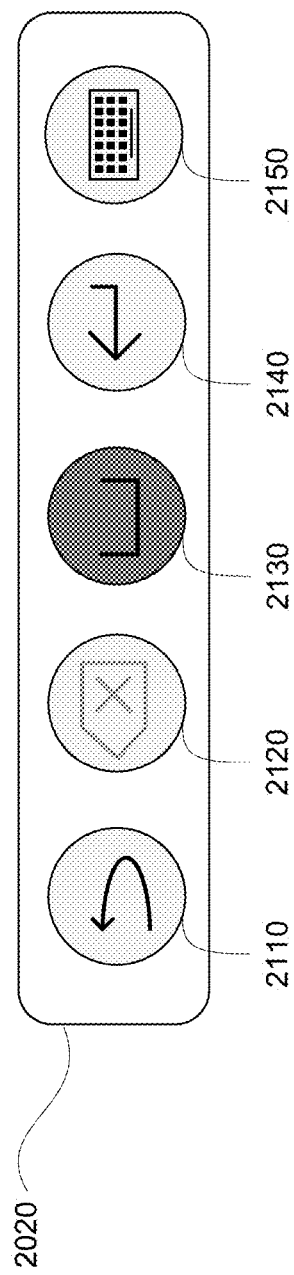
FIG. 22 is an example toolbar in accordance with aspects of the disclosure.
Figure 23:
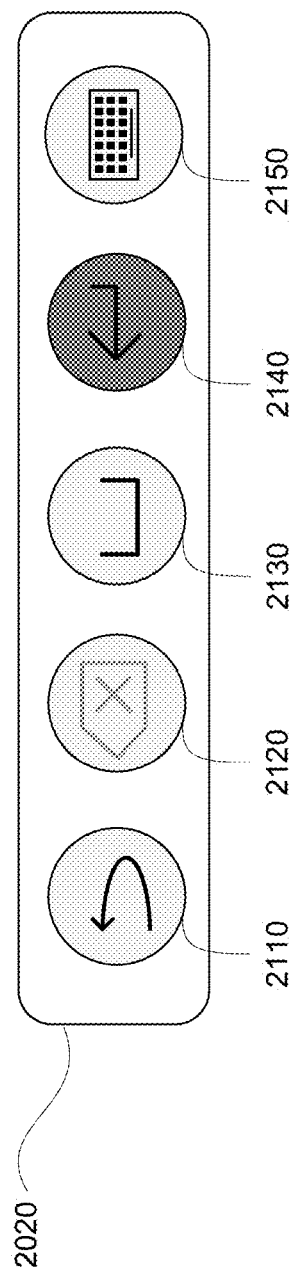
FIG. 23 is an example toolbar in accordance with aspects of the disclosure.
Figure 24:
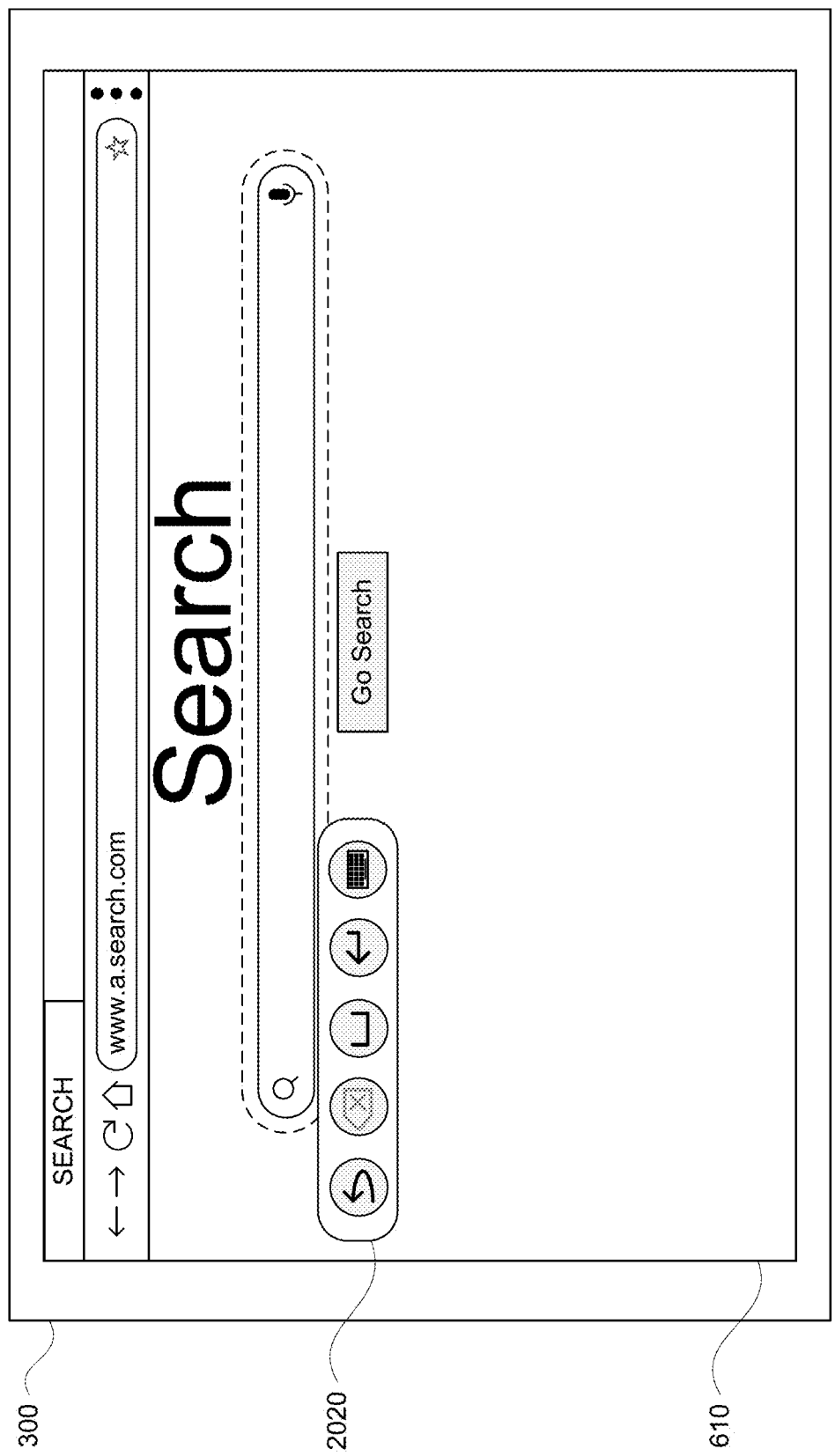
FIG. 24 is an example webpage, toolbar, and handwriting field displayed on a touch sensitive display of a computing device in accordance with aspects of the disclosure.

In some instances, when the toolbar is displayed, users may be able to select and toggle through the buttons of the toolbar using a keyboard (e.g., a peripheral rather than a virtual keyboard). For instance, in some cases, a single tap on a particular button may cause the processors to highlight that button but not actually select the button (i.e., cause the processor to engage the corresponding action of the button). For instance, as shown in FIG. 22, the button 2130 with the space symbol is shown as highlighted. In this way, the user may use a tab button of the keyboard to toggle through the different buttons, highlighting the buttons one after another as shown between FIGS. 22 and 23. For instance, in FIG. 23, button 2130 with the space symbol is initially shown as highlighted. Once the tab button of the keyboard is selected, as shown in FIG. 23, button 2130 with the space symbol is no longer shown as highlighted and the next button in the toolbar 2020, the button 2140 with the return symbol is now shown as highlighted. The user may then select the currently highlighted button by using the return or enter button on the keyboard. The toolbar 2020 may be presented away from the area of the handwriting field in order not to intrude on the user's ability to use the stylus tip to write within the handwriting field. For instance, the processors may typically display the toolbox directly above (or within a short distance such as 1 centimeter or more or less to avoid cluttering the display) the text box and towards the left (if the default language is written left to right) as shown in FIG. 20 and towards the right (if the default language is written from right to left). However, if this area would be fully or partially out of view on the display, as shown in FIG. 24, the processors may display the toolbar 2020 directly below the text box (or within a short distance such as 1 centimeter or more or less to avoid cluttering the display) and towards the left (if the default language is written left to right) and towards the right (if the default language is written from right to left). The display of the toolbar may further indicate that the writing mode has been activated. The toolbar may also be movable, that is, the processors may respond to a user taping and holding on the toolbar with a finger or the stylus and dragging, by moving the toolbar to a new location on the display according to the dragging.

The buttons or options of the toolbar may be added or removed and/or the corresponding actions of these buttons changed by the processors depending on the type of the identified text box. For instance, when a user is writing in longer text boxes or fields such as note or email, the button with the return symbol may be included in order to enable the user to start a new paragraph by inserting a return character. As another instance, the button with the emoji symbol may be displayed only in situations in which the text box corresponds to a text message, email, or note pad or virtual "sticky" note. Similarly, when the text box is a text box which corresponds to a search field, the toolbar may include a return, enter or submit button corresponding to the same functions as such a button on a typical keyboard.

The handwriting field may also enable users to use gestures to make edits to the text in the text box. In this regard, the user may be able to edit the converted text using their stylus as with other stylus applications. For instance, the user may place or reposition a cursor with a single tap, select a word with a long tap or by circling a word, swipe to delete or erase typed text (e.g., strike through), swipe to join characters together, swipe to insert a new space between characters within the text box or new typed text within the text box, etc. For instance, if a word of typed text within the text box is selected and the user continues writing within the handwriting field, the selected word may be deleted and replaced with new typed text converted from the new handwriting. In this regard, when a user makes a stroke using a stylus over typed text within a text box, this may take precedence over handwriting within the handwriting field. In some instances, the toolbar or another location may be accessible to provide users with a tutorial on how to perform gesture-based edits on the typed text in the text field rather than only the typed text corresponding to converted handwriting or converted handwriting in the handwriting field.

Once the user is finished writing, the user may be able to deactivate the writing mode and effectively cause the processors to close or remove the handwriting field. As such, the area of the handwriting field is no longer registered as a writable area. In addition, if displayed the toolbar may also be closed or removed by the processors. Finally, if there is any unconverted handwriting displayed within the handwriting field, the processors may cause this unconverted handwriting and any preview typed text to disappear. For instance, to deactivate the writing mode, the user may use the tip of the stylus or a finger to select a particular option in the toolbar which, in some examples, may take the form of a button with a return, enter or submit symbol. In addition, or alternatively, the handwriting mode may be deactivated by one or more of the user navigating to a new webpage (click a link, close the page, etc.), utilizing a launch feature (e.g., a feature that allows the user to open new applications), or scrolling on a webpage by touching a dragging outside of the handwriting field.

The features described herein may provide an improved stylus-based human-computer device interface. For instance, prior systems may enable such features only with bulky and visually distracting virtual keyboards or popup boxes which may prevent a user from being able to view the entire display. Thus, the improved interface may provide for the technical solution of utilizing a handwriting field without visual impact on the display and thereby allowing for the seamless inputting of text into a text box using a stylus without such disadvantages. In addition, such features may provide the technical advantages of enabling the continued use of a stylus without having to switch inputs based on task type, such as text messaging, writing on a notepad (e.g., note taking) or a virtual "sticky" note, writing in a cell of a spreadsheet, or writing more sophisticated text editors such as those used for email or larger text files. Because of this, context switching, such as going from a clicking or scrolling task to a writing task and back, using a stylus may be particularly efficient and so may be quick and seamless for the user. Moreover, because the features described herein can be used with any number of different platforms or applications, more consistent stylus-based interaction may be provided across platforms. In other words, devices may function in a consistent manner (e.g., in relation to locations in which stylus-based writing can be performed, what editing capabilities are provided, how activation/deactivation of the feature can be performed, etc.). By bypassing the virtual keyboard and allowing a stylus to be used to write directly to the text box and reducing the need to tap buttons or making additional inputs, this may make the overall process of interacting via a stylus more efficient (and also quicker, more natural and more intuitive for the user) and thereby provide additional technical advantages. For instance, this may enable users to continue interacting with their device via their stylus, thereby providing an uninterrupted workflow, and a reduced amount of time spent on keystrokes.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
 receiving, by one or more processors of a computing device, first user input identifying a text box displayed on a display of the computing device;
 based on the received first user input, generating, by the one or more processors, a handwriting field on the display without visual impact on the display;

receiving, by the one or more processors, second user input within the handwriting field;

converting, by the one or more processors, the second user input into typed text;

as the second user input is being converted to the typed text, displaying handwriting with a particular visual appearance of an aspect of the handwriting on a display based on a proximity of the second user input to an edge of the handwriting field or the display; and displaying, by the one or more processors, the typed text in the text box.

2. The method of claim 1, wherein the text box corresponds to at least one of a text message, a cell of a spreadsheet document, a search field, or an email.

3. The method of claim 1, wherein the first user input includes a stylus tapping or dragging on an area within the text box.

4. The method of claim 1, wherein the first user input includes a stylus tapping on an area within a predetermined distance of the text box.

5. The method of claim 1, wherein the first user input includes a stylus beginning to write within an area of the text box.

6. The method of claim 5, further comprising:
receiving third user input outside of the handwriting field; and
disregarding the third user input without updating the typed text in the text box.

7. The method of claim 1, wherein the handwriting field is generated without requiring the one or more processors to first call and display a virtual keyboard.

8. The method of claim 1, wherein the handwriting field is a two-dimensional field that is registered as an area at which the one or more processors can expect to receive and display strokes made using a stylus on display.

9. The method of claim 1, wherein the handwriting field is generated to correspond to an area of the text box and an additional area within a predetermined distance of the text box.

10. The method of claim 1, further comprising, as the second user input is received, expanding an area of the handwriting field.

11. The method of claim 1, wherein the handwriting field is generated to correspond to an entire area of the display.

12. The method of claim 1, further comprising, in response to receiving the first user input, displaying a toolbar based on a location of the text box on the display.

13. The method of claim 1, once the displayed handwriting has disappeared from the display, causing an area of the handwriting to no longer be writable within the handwriting field.

14. The method of claim 1, wherein displaying the typed text in the text box includes displaying within a browser window.

15. A system comprising:
a computing device having a display and one or more processors configured to:
receive first user input identifying a text box displayed on the display;
based on the received first user input, generate a handwriting field on the display without visual impact on the display;
receive second user input within the handwriting field;
convert the second user input into typed text;
as the second user input is being converted to the typed text, display handwriting by changing a particular visual appearance of an aspect of the handwriting on a display based on a proximity of the second user input to an edge of the handwriting field or the display; and
display the typed text in the text box.

16. The system of claim 15, further comprising a stylus, and wherein the first user input includes the stylus tapping or dragging on an area within the text box.

17. The system of claim 15, further comprising a stylus, and wherein the first user input includes the stylus tapping on an area within a predetermined distance of the text box.

18. The method of claim 1, wherein the aspect is a color of the displayed handwriting, and wherein displaying the handwriting on the display includes changing the color of the displayed handwriting based on the proximity of the second user input to the edge of the handwriting field or the display.

19. The method of claim 1, wherein the particular visual appearance indicates that the stylus is approaching the edge of the handwriting field.

20. The method of claim 1, further comprising, shifting the handwriting field on the display in response to a shift in other displayed information on the display.

21. The method of claim 1, further comprising, as the second user input is being converted to the typed text, displaying a preview of typed text within the text box.

22. The method of claim 1, in response to generating the handwriting field, providing a signal to indicate that a writing mode is active and a user is now able to use the stylus to enter text into the text box.

23. The method of claim 22, wherein the signal is a popup box.

24. The method of claim 1, further comprising:
receiving third using input corresponding to tapping on the text box with the typed text; and
in response to the third user input, allowing additions to the typed text by entering fourth user input into the handwriting field.

* * * * *

UNITED STATES PATENT AND TRADEMARK OFFICE
CERTIFICATE OF CORRECTION

| | |
|---|---|
| PATENT NO. | : 11,922,009 B2 |
| APPLICATION NO. | : 17/952954 |
| DATED | : March 5, 2024 |
| INVENTOR(S) | : Donny Chen Reynolds et al. |

It is certified that error appears in the above-identified patent and that said Letters Patent is hereby corrected as shown below:

In the Claims

Claim 19, Column 20, Line 32:
Now reads: "the stylus"; should read -- a stylus --

Claim 22, Column 20, Lines 42 and 43:
Now reads: "the stylus"; should read -- a stylus --

Signed and Sealed this
Sixteenth Day of April, 2024

Katherine Kelly Vidal
*Director of the United States Patent and Trademark Office*